United States Patent
Rohde et al.

(10) Patent No.: US 12,028,685 B2
(45) Date of Patent: *Jul. 2, 2024

(54) HEARING AID SYSTEM FOR ESTIMATING ACOUSTIC TRANSFER FUNCTIONS

(71) Applicant: Oticon A/S, Smørum (DK)

(72) Inventors: Nels Hede Rohde, Smørum (DK); Thomas Bentsen, Smørum (DK); Anders Brødløs Olsen, Smørum (DK); Michael Syskind Pedersen, Smørum (DK); Svend Feldt, Ballerup (DK); Jesper Jensen, Smørum (DK)

(73) Assignee: Oticon A/S, Smørum (DK)

( * ) Notice: Subject to any disclaimer, the term of this patent is extended or adjusted under 35 U.S.C. 154(b) by 69 days.

This patent is subject to a terminal disclaimer.

(21) Appl. No.: 17/970,275

(22) Filed: Oct. 20, 2022

(65) Prior Publication Data

US 2023/0044634 A1 Feb. 9, 2023

Related U.S. Application Data

(63) Continuation of application No. 17/186,550, filed on Feb. 26, 2021, now Pat. No. 11,510,019.

(30) Foreign Application Priority Data

Feb. 27, 2020 (EP) ..................... 20159690

(51) Int. Cl.
*H04R 25/00* (2006.01)
*G01B 17/00* (2006.01)
*H04M 1/72409* (2021.01)

(52) U.S. Cl.
CPC ........... *H04R 25/505* (2013.01); *G01B 17/00* (2013.01); *H04M 1/72409* (2021.01);
(Continued)

(58) Field of Classification Search
CPC .... H04R 25/505; H04R 25/609; H04R 25/30; H04R 25/405; H04R 25/407;
(Continued)

(56) References Cited

U.S. PATENT DOCUMENTS

2012/0063610 A1 3/2012 Kaulberg et al.
2014/0307902 A1 10/2014 Ku et al.
(Continued)

FOREIGN PATENT DOCUMENTS

EP 2 928 215 A1 10/2015

*Primary Examiner* — Mark Fischer
(74) *Attorney, Agent, or Firm* — Birch, Stewart, Kolasch & Birch, LLP

(57) ABSTRACT

A hearing aid system comprises a hearing aid, and a portable auxiliary device' adapted to establish a communication link between them. The hearing aid comprises a microphone providing an electric input signal, a signal processor, and an output unit. The auxiliary device comprises a microphone providing an auxiliary electric input signal, and a user control interface allowing a user to initiate a specific calibration mode of operation of the hearing aid system. The signal processor of the hearing aid is configured to receive corresponding time segments of said electric input signal and said auxiliary electric input signal to provide an estimate of an acoustic transfer function from said microphone of said auxiliary device to said microphone of said hearing aid. A method of operating a hearing aid system is further disclosed. The invention may e.g. be used in various applications related to own voice detection and estimation.

26 Claims, 5 Drawing Sheets

(52) U.S. Cl.
CPC ........... *H04R 25/30* (2013.01); *H04R 25/405* (2013.01); *H04R 25/407* (2013.01); *H04R 25/552* (2013.01); *H04R 25/558* (2013.01); *H04R 25/604* (2013.01); *H04R 25/609* (2019.05); *H04R 2225/021* (2013.01); *H04R 2225/025* (2013.01); *H04R 2225/43* (2013.01); *H04R 2225/55* (2013.01); *H04R 2225/67* (2013.01)

(58) Field of Classification Search
CPC .. H04R 25/552; H04R 25/558; H04R 25/604; H04R 2225/021; H04R 2225/025; H04R 2225/43; H04R 2225/55; H04R 2225/67; H04M 1/72409; G01B 17/00
See application file for complete search history.

(56) References Cited

U.S. PATENT DOCUMENTS

2019/0115041 A1  4/2019  Jensen et al.
2019/0297435 A1  9/2019  Pedersen et al.

HEARING AID SYSTEM FOR ESTIMATING ACOUSTIC TRANSFER FUNCTIONS

This application is a Continuation of copending application Ser. No. 17/186,550, filed on Feb. 26, 2021, which claims priority under 35 U.S.C. § 119(a) to Application No. 20159690.5, filed in Europe on Feb. 27, 2020, all of which are hereby expressly incorporated by reference into the present application.

SUMMARY

The present application deals with hearing aid systems and hearing aids or headsets. The disclosure is mainly related to functionality centred around own-voice detection and/or own voice estimation, i.e., e.g. focused on detecting when a hearing aid (HA) user speaks, and/or own-voice retrieval, i.e., e.g. retrieving an enhanced version of the HA-user's voice signal when spoken in a potentially acoustically noisy situation. Own-voice detection and retrieval are key technologies, e.g. for hands-free telephony, voice-controlled hearing devices, etc. The ideas of the present disclosure focus on personalized solutions, i.e., methods for improving performance of different algorithms, by tailoring them to particular (acoustic) characteristics of the specific user, e.g., voice characteristics, head and torso characteristics, etc.

To do so, it is proposed to use a mobile phone (or any other mobile (e.g. portable, e.g. wearable) communication device comprising a microphone and/or a loudspeaker) as
  a) a wireless microphone, and/or
  b) a wireless loudspeaker.
  The underlying assumption is that most hearing aid (HA) or headset (HS) users are (or will be) equipped with a mobile phone (or similar portable (e.g. wearable) device) and will be quite proficient in using it.

Using a mobile phone (or similar mobile device) as a wireless microphone allows a user
  i) to pick up a voice sample of the user (in the mobile device, and/or in the hearing aid).
  ii) to estimate the acoustic transfer function from (just outside) the mouth of the HA- or HS-user to each of the microphones in the HAs (or of the HS) (we denote these acoustic transfer functions as Own-Voice Transfer Functions (OVTFs)), Using a mobile phone (or similar mobile device) as a wireless loudspeaker allows a user
  iii) to estimate the acoustic transfer function from an arms distance, e.g. frontal to the HA (or HS) user, e.g. a typical position of a conversation partner, to the microphones of the HAs (or the HS) (frontal Head Related Transfer Function (HRTF)).

EP2928215A1 describes the use of a mobile device comprising a loudspeaker to provide personalized beamforming, see e.g. FIG. 1 of EP2928215A1 and the corresponding description.

US20120063610A1 deals with wireless audio streaming scenarios wherein the acoustical audio signal is present in parallel to a corresponding wireless electromagnetic signal, e.g. audio streaming from a TV, audio streaming in a classroom, etc. The two representations are used in combination to present to the user in various examples, one being used to improve the other. In one example, the acoustically propagated signal is improved by using the 'clean' wirelessly received signal for noise reduction before being presented to the user. US20120063610A1 indicates that a difference in transfer function between an acoustic and an electromagnetic propagation path of sound from another device to a hearing aid microphone can be estimated.

US20190115041A1 deals with the same scenario as US20120063610A1 (reception of respective acoustically and wirelessly propagated representations of a target signal). A delay between a wirelessly and an acoustically received target signal is estimated. This may represent an estimate of a transfer function from the microphone of the auxiliary device to a microphone of the hearing aid.

In the following, various ideas and applications are presented in the context of a hearing aid system. However, they are equally applicable to other head-worn communication devices, e.g., headsets, helmets, etc.

A First Hearing Aid System:

In an aspect, a hearing aid system comprising a hearing aid AND an auxiliary device is provided.

In an aspect of the present application, a hearing aid system is provided. The hearing aid system may comprise A) a (e.g. at least one) hearing aid adapted for being worn by a user at an ear, or in an ear, of the user, or for being fully or partially implanted in the head at an ear of the user, and B) a portable auxiliary device, e.g. a communication device, such as a smartphone. The hearing aid system may be adapted to establish a communication link between the hearing aid and the auxiliary device to provide that data, e.g. control signals, status signals, and/or audio signals, can be exchanged between them or forwarded from one to the other. The hearing aid may comprise at least one microphone for picking up sound from the environment of the hearing aid and configured to provide corresponding at least one electric input signal representative of the sound. The hearing aid may further comprise a signal processor configured to process the electric input signal or a signal derived therefrom and to provide a processed signal. The hearing aid may further comprise an output unit, e.g. comprising a loudspeaker, for presenting stimuli perceivable as sound to the user representative of the processed signal. The auxiliary device may comprise at least one microphone for picking up sound from the environment of the auxiliary device and to provide corresponding at least one auxiliary electric input signal representative of the sound. The auxiliary device may further comprise a user control interface allowing a user to initiate a specific calibration mode of operation of the hearing aid system. The signal processor of the hearing aid may be configured to compare corresponding current time segments of the at least one electric input signal, and the at least one auxiliary electric input signal, or corresponding transforms (or selected frequency ranges) thereof, and to provide an estimate of a transfer function from the at least one microphone of the auxiliary device to the at least one microphone (e.g. two or more) of the hearing aid.

Thereby an improved hearing aid system may be provided.

The term 'corresponding transforms' may e.g. include Fourier transforms, e.g. Short-time Fourier transform (STFT), Discrete-time Fourier transform (DTFT), etc., or other transforms, such as e.g. Laplace transform, cosine or sine transform (e.g. Discrete cosine or sine transform), etc.

When transmitting electric signals representing audio between devices, e.g. from the 'at least one auxiliary electric signal' from the auxiliary device to the hearing aid (or vice versa), it may be considered (in an attempt to limit transmission bandwidth, and thus power) to only transmit selected frequency ranges (e.g. the most important frequency ranges, e.g. frequency ranges containing (e.g. important) speech components).

When the at least one microphone of the auxiliary device is positioned in proximity of, e.g. in front of, the user's mouth, the transfer function may represent an own voice transfer function (OVTF), when the user—during the own voice calibration mode of operation of the hearing aid system—raises his or her voice, e.g. speaks. Preferably, the microphone of the auxiliary device is positioned less than a maximum distance from the mouth of the user when the user speaks. The maximum distance may e.g. be 0.1 m, such as 0.05 m, or 0.02 m. The user interface may be configured to initiate a measurement of respective own voice transfer function(s) in the specific own voice calibration mode of operation of the hearing aid system. The hearing aid system may e.g. be configured to instruct the user—e.g. via the user interface of the auxiliary device—how to position (and/or orientate) the auxiliary device relative to the user, and/or to speak a certain phrase or sentence (e.g. with a particular vocal effort, e.g. loud or soft, etc., e.g. in dependence of a current noise level around the user), cf. e.g. FIG. 4B.

The hearing aid system may comprise at least one voice activity detector allowing to classify an electric input signal representing sound (e.g. time segments thereof) as originating from a human voice or not originating from a human voice, possibly to classify it as own voice or not own voice, e.g. classify the sound as speech or not speech. The classification of time segments may be performed on a frequency sub-band level. The classification may be binary (e.g. 0 or 1, or 'no' or 'yes', etc.) or probabilistic (e.g. a value between 0 and 1). Own voice is in the present context taken to mean the voice of the wearer of the hearing aid ('the user').

The initiation of the specific own voice calibration mode of operation of the hearing aid system may e.g. include a simultaneous start of a recording of the user's own voice (e.g. in the form of time segments of electric signals from the available microphones), e.g. when an own voice detector indicates that the user' own voice is present, or is present with a probability above a, e.g. predetermined (or adaptively determined), threshold value. The user interface is configured to allow a user to initiate a specific calibration, e.g. to start recording (e.g. storing) corresponding current time segments of the at least one electric input signal, and the at least one auxiliary electric input signal.

The auxiliary device may be configured to generate a calibration control signal upon initiation of a specific calibration from the user interface. The auxiliary device may be configured to transmit the calibration control signal to the hearing aid. The auxiliary device may be configured to start and/or stop recording a time segment of the at least one auxiliary electric input signal in dependence of the calibration control signal. The hearing aid may be configured to receive the calibration control signal from the auxiliary device. The hearing aid may be configured to start and/or stop recording a time segment of the at least one electric input signal in dependence of the calibration control signal. The auxiliary device may be configured to start and/or stop transmitting a current time segment of the at least one auxiliary electric input signal to the hearing aid in dependence of the calibration control signal.

The hearing aid may be configured to determine a (e.g. frequency dependent) transfer function based on the recorded time segments of the at least one electric input signal and the at least one auxiliary electric input signal. The hearing aid may be configured to determine a transfer function in dependence of the calibration control signal. The hearing aid may be configured to determine a transfer function in dependence of an own voice control signal, e.g. in that only parts of the recorded time segments coinciding with an indication by the own voice control signal that the user's voice is present are used. The hearing aid may be configured to determine a transfer function in dependence of the calibration control signal and the own voice control signal.

The hearing aid and the auxiliary device may comprise respective antenna and transceiver circuitry allowing the communication link between the hearing aid and the auxiliary device to be established.

The user interface may be configured to control functionality of the hearing aid system (including an initiation (and/or a termination) of the own voice calibration mode).

The corresponding (e.g. current) time segments of the at least one electric input signal, and the at least one auxiliary electric input signal, or corresponding transforms, or selected frequency ranges thereof, may be stored in a memory of the hearing aid system. The memory may be distributed between the hearing aid and the auxiliary device (or located in another device or system). The current time segment of the at least one electric input signal, or a transform thereof, may be stored in a memory of the hearing aid. The current time segment of the at least one auxiliary electric input signal, or a transform thereof, may be stored in a memory of the auxiliary device. The current time segment of the at least one auxiliary electric input signal, or a transform thereof, may be transmitted to the hearing aid via the communication link. The current time segment of the at least one auxiliary electric input signal may, when received in the hearing aid, be stored in the memory of the hearing aid. Based thereon, the two corresponding current time segments of the respective electric input signals may be used (e.g. on a frequency by frequency basis) to determine a (frequency dependent, acoustic) transfer function from the (at least one microphone of the) auxiliary device to an appropriate one of the at least one microphones of the hearing aid. The thus determined (acoustic) transfer function(s) or a representation thereof may be stored in a memory or the hearing aid system, e.g. in the memory of the hearing aid.

The hearing aid may comprise at least a part of the memory wherein time segments of the at least one electric input signal, and/or the at least one auxiliary electric input signal, or corresponding transforms, or selected frequency ranges thereof, can be stored.

The hearing aid may comprise an own voice detector. The hearing aid may be configured to only store the time segment of the at least one electric signal when the own voice detector indicates that the user's voice is present (or present with a probability above a threshold value, e.g. 50%).

The auxiliary device may be configured to generate a calibration control signal upon initiation of the specific calibration from the user interface.

The auxiliary device may be configured to transmit a current time segment of the at least one auxiliary electric input signal to the hearing aid in dependence of the calibration control signal.

One of the at least one microphones of the hearing aid may be defined as a reference microphone. The hearing aid may comprise at least two microphones, each for picking up sound from the environment of the hearing aid and to provide corresponding at least two electric input signals representative of said sound. One of said at least two microphones may be defined as a reference microphone. The definition of a reference microphone may be used to determine relative (acoustic) transfer functions for a given sound source location from the reference microphone to other microphones of the hearing aid system.

The auxiliary device may comprise a loudspeaker and the auxiliary device may be configured—in a separate far-field calibration mode of operation—to play a test sound signal to the environment of the auxiliary device and to transmit an electric version of the test sound to the hearing aid in dependence of an input from the user control interface. The user interface may be configured to initiate a measurement of respective head-related transfer function(s) in the specific far-field calibration mode of operation. The hearing aid system may be configured to instruct the user—e.g. via the user interface of the auxiliary device—how to act during the far-field calibration mode (e.g. how to position (and/or orientate) the auxiliary device relative to the user), cf. e.g. FIG. 4C. In the far-field calibration mode, the auxiliary device is positioned at a preferred location relative to the user (specifically to the hearing aid microphone(s) for which an (acoustic) transfer function is to be estimated), e.g. held in a hand, or located at or on a table or other support. The preferred location (e.g. distance, angle, etc.) relative to the user may be known in advance, or estimated during calibration, e.g. using one or more sensors, e.g. of the auxiliary device and/or the hearing aid. The hearing aid system may be configured to make data representative of the estimated location available (e.g. transmitted) to the hearing aid. Specifically, a distance between the auxiliary device and the hearing aid (e.g. between the loudspeaker of the auxiliary device and one of the microphones, e.g. a reference microphone, of the hearing aid), may be estimated and stored, e.g. in the hearing aid. The distance may e.g. be estimated in the auxiliary device, and e.g. transmitted to the hearing device.

The hearing aid system may comprise a distance sensor for estimating a distance between the auxiliary device and the hearing aid. The auxiliary device may, in a calibration mode of operation where head-related transfer functions of the user are estimated (the far-field calibration mode), be configured to estimate a distance between the auxiliary device (e.g. the loudspeaker of the auxiliary device) and the hearing aid. The distance sensor may comprise an image sensor, e.g. a camera (such as a high-speed camera).

The hearing aid system may be configured to—in said specific far-field calibration mode of operation—provide a test signal (e.g. by a signal generator, or by a stored waveform), which when played by said loudspeaker provides said test sound signal. The hearing aid system, e.g. the auxiliary device, may comprise a test signal generator for providing a test signal, which when played by said loudspeaker provides the test sound signal. The test signal generator may be connectable to the loudspeaker and may e.g. be connected to the loudspeaker as part of the specific far-field calibration mode. The test signal may be configured to comprise (or mimic) speech (to thereby ensure that the relevant frequencies of speech are included). The hearing aid may comprise a memory accessible to the signal processor, e.g. for—during the far-field mode of operation—storing a time segment of the at least one electric signal and possibly of the at least one auxiliary electric signal, and possibly of a representation of a resulting acoustic transfer function. A memory of the hearing aid system (e.g. the hearing aid or the auxiliary device or another device) may comprise a test signal segment which when played by the loudspeaker of the auxiliary device provides the test sound signal.

The test sound signal may be configured to contain frequencies of importance for the application in question, e.g. in that it contains energy at frequencies of importance, e.g. at speech frequencies, e.g. between 1 kHz and 5 kHz. It may be beneficial that the test sound signal is a chirp signal (e.g. a tonal signal whose frequency increases with time). Thereby, the HRTF may be estimated using a procedure as e.g. outlined in [Farina, 2000]. The test sound signal may be adaptively configured in level relative to a current ambient noise level (to ensure a test sound signal to noise ratio above a certain (e.g. predefined) minimum SNR-threshold).

The hearing aid may be configured to—in said specific far-field calibration mode of operation—store a time segment of said at least one electric signal when said test sound signal is picked up by said at least one microphone of the hearing aid. The hearing aid system may be configured to—in said specific far-field calibration mode of operation—transmit said test sound signal to said hearing aid (e.g. via the communication link). The hearing aid may be configured to receive the test sound signal and to store it in the memory. The signal processor of the hearing aid may be configured to receive the test sound signal and a time segment of the at least one electric signal (e.g. the time segment received by a reference microphone) and (based thereon) to determine a head related transfer function (HRTF) from the location of the loudspeaker to the at least one microphone (e.g. the reference microphone).

A hearing aid system wherein the signal processor of the hearing aid—in said specific far-field calibration mode of operation—is configured to receive said electric version of the test sound and said time segment of said at least one electric signal and based thereon to determine an acoustic transfer function from the position of the loudspeaker of the auxiliary device to the at least one microphone of the hearing aid. The acoustic transfer function from the position of the loudspeaker of the auxiliary device to the at least one microphone of the hearing aid is here also termed the head related transfer function (for the acoustic channel from the location of the loudspeaker to the location of the microphone in question).

The hearing aid system may comprise a carrier, e.g. a 'selfie-stick', adapted to receive and carry the auxiliary device, so that the auxiliary device can be positioned farther away from the user than an arm's length. The auxiliary device may be attached to the carrier, e.g. the selfie stick. Based on correlation (e.g. determined by the hearing aid), e.g., between the electric signal(s) of the at least one hearing aid microphones and the electric signal(s) of the at least one microphone of the auxiliary device, the length of the selfie stick may be adjusted such that a desired distance between the hearing instrument microphones and the phone in front of the user is obtained. Oppositely, a given distance may be indicated by the correlation measurement. The hearing aid system may be configured to initiate the calibration measurement when a certain (e.g. predefined) distance (e.g. indicated by the user via the user interface) is obtained. Hereby the user does not have to actively initiate the measurement. The user may be notified prior to the beginning of the calibration measurement (to achieve that the user is not moving during the measurement). Notification may happen via the phone screen, by audio from the phone, or via audio played via the output unit of the hearing aid.

The hearing aid may comprise a beamformer filter configured to provide one or more beamformers, where filter weights of said one or more beamformers are personalized using said transfer functions. The one or more beamformers may comprise an own voice beamformer aimed at picking up the voice of the user (in which case the calibrated own voice transfer functions are used in the determination of the filter weights). The one or more beamformers may comprise far-field-beamformer aimed at picking up the voice of a communication partner (in which case the calibrated head related transfer functions are used in the determination of the filter weights).

The one or more beamformers may comprise an own voice beamformer comprising personalized filter weights, the own voice beamformer being configured to enhance signals originating from the direction of the user's mouth and to suppress sound signals from other directions. The own voice beamformer may be configured to provide an estimate of the user's own voice. The hearing aid may—e.g. in a telephone mode of operation—be configured to transmit the estimate of the user's own voice signal to another device, e.g. to the auxiliary device (e.g. a smartphone).

The one or more beamformers may further comprise a beamformer comprising personalized filter weights, the beamformer being configured to suppress sound signals from a far-field speaker.

The hearing aid may be constituted by or comprise a hearing instrument for compensating the user's hearing impairment.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing aid system or hearing aid(s). The function of a remote control for the hearing aid system may be implemented in a smartphone. The auxiliary device, e.g. the smartphone, may be configured to run an application (APP) allowing to control functionality of the hearing aid via the auxiliary device. The hearing aid(s) may comprise an appropriate wireless interface to the auxiliary device, e.g. a smartphone, e.g. based on Bluetooth or some other standardized or proprietary scheme.

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for allowing a user to select and/or combine an appropriate one of the received audio signals (or combination of signals) for transmission to the hearing aid.

The hearing aid system may comprise two hearing aids adapted to implement a binaural hearing aid system. The two hearing aids may comprise appropriate antenna and transceiver circuitry allowing them to exchange data (e.g. audio and/or control data) between them. Thereby (expected) symmetries may be exploited (in particular in the determination of own voice transfer functions and far-field (head related) transfer functions from a front direction relative to the user).

A Second Hearing Aid System:

In a further aspect of the present application, a hearing aid system is provided. The hearing aid system may comprise A) a (e.g. at least one) hearing aid adapted for being worn by a user, and B) a portable auxiliary device, e.g. a communication device, such as a smartphone. The hearing aid system may be adapted to establish a communication link between the hearing aid and the auxiliary device to provide that data can be exchanged between them. The hearing aid may comprise at least one microphone for picking up sound from the environment of the hearing aid and configured to provide corresponding at least one electric input signal representative of the sound. The auxiliary device may comprise at least one microphone for picking up sound from the environment of the auxiliary device and to provide corresponding at least one auxiliary electric input signal representative of the sound. The hearing aid system may further comprise a signal processor configured to—in a specific own voice calibration mode of operation of the hearing aid system—compare corresponding current time segments of the at least one electric input signal, and the at least one auxiliary electric input signal, or corresponding transforms (or selected frequency ranges) thereof, wherein said corresponding current time segments are recorded while the user speaks, and to provide an estimate of a personalized own voice transfer function from the at least one microphone of the auxiliary device to the at least one microphone (e.g. two or more) of the hearing aid, when worn by the user. The at least one microphone of the auxiliary device is preferably positioned close to (e.g. less than 0.1 m from) the user's mouth, when the user speaks in the own voice calibration mode.

Thereby, a hearing aid system with improved functionality may be provided.

The signal processor may be located in the hearing aid. The hearing aid may be configured to receive the at least one auxiliary electric input signal from the auxiliary device. The signal processor of the hearing aid may be configured to receive corresponding time segments of the at least one electric input signal and the at least one auxiliary electric input signal, or corresponding transforms, or selected frequency regions thereof, and to provide an estimate of a personalized own voice transfer function from the at least one microphone of the auxiliary device to the at least one microphone of the hearing aid.

The signal processor may be located in the auxiliary device. The auxiliary device may be configured to receive the at least one electric input signal from the hearing aid. The signal processor of the auxiliary device may be configured to receive corresponding time segments of the at least one electric input signal and the at least one auxiliary electric input signal, or corresponding transforms, or selected frequency regions thereof, and to provide an estimate of a personalized own voice transfer function from the at least one microphone of the auxiliary device to the at least one microphone of the hearing aid. The auxiliary device may be configured to transmit the personalized own voice transfer function to the hearing aid (or to an external processing device).

The signal processor may be located in an external processing device (different from the hearing device and the auxiliary device). The external processing device may be configured to receive the at least one electric input signal from the hearing aid as well as the at least one auxiliary electric input signal from the auxiliary device. The signal processor of the external processing device may be configured to receive corresponding time segments of the at least one electric input signal and the at least one auxiliary electric input signal, or corresponding transforms, or selected frequency regions thereof, and to provide an estimate of a personalized own voice transfer function from the at least one microphone of the auxiliary device to the at least one microphone of the hearing aid. The external processing device may be configured to transmit the personalized own voice transfer function to the hearing aid. The external processing device may be or form part of a stationary device, e.g. a charging station or a TV-adapter or similar accessory device for the hearing aid. The external processing device may be configured to have more processing capacity and more energy than the hearing aid.

The hearing aid may further comprise a hearing aid signal processor configured to process the electric input signal or a signal derived therefrom and to provide a processed signal.

The hearing aid signal processor may include the signal processor of the hearing aid system.

The hearing aid may further comprise an output unit, e.g. comprising a loudspeaker, for presenting stimuli perceivable as sound to the user representative of the processed signal.

The auxiliary device (and/or the external processing device) may comprise a user control interface allowing a user to initiate the specific own voice calibration mode of operation of the hearing aid system.

The hearing aid system may comprise one or more detectors configured to decide whether or not (or with what probability) the user is currently wearing the hearing aid (or hearing aids of a binaural hearing aid system) and to provide a mode control signal indicative thereof. The hearing aid system may be configured to only allow to enter the own voice calibration mode, in dependence of the mode control signal.

The hearing aid may comprise a beamformer filter configured to provide an own voice beamformer comprising personalized filter weights determined in dependence of said estimate of a personalized own voice transfer function. The own voice beamformer may be configured to enhance signals originating from the direction of the user's mouth relative to sound signals from other directions.

The features of the first hearing aid system described above in the detailed description of embodiments and in the claims are intended to be combinable with the second hearing aid system as described above.

A Hearing Aid Configured to be Used in a Hearing Aid System:

In a further aspect, a hearing aid configured to be used in the first and second hearing aid system as described above, in the detailed description of embodiments and in the claims is provided by the present disclosure.

The hearing aid is adapted for being worn by a user at a or in an ear of the user, or for being fully or partially implanted in the head at an ear of the user. The hearing aid is adapted to establish a communication link to an auxiliary device (e.g. a smartphone) to provide that data can be exchanged between them or forwarded from one to the other. The hearing aid may further comprise an input unit comprising at least one microphone for picking up sound from the environment of the hearing aid and to provide corresponding at least one electric input signal representative of said sound, a signal processor configured to process said at least one electric input signal or a signal or signals derived therefrom and to provide a processed signal, and an output unit, e.g. comprising a loudspeaker, for presenting stimuli perceivable as sound to the user representative of the processed signal.

The hearing aid may comprise antenna and transceiver circuitry allowing the hearing aid to establish a communication link to an auxiliary device to provide that data can be exchanged between them or forwarded from one to the other.

The hearing aid may comprise an output transducer for presenting stimuli perceivable as sound to the user representative of the processed signal.

The hearing aid may be configured to receive an auxiliary electric input signal provided by a microphone of said auxiliary device via said communication link. The signal processor may—in a specific own voice calibration mode of operation of the hearing aid system—be configured A) to receive corresponding time segments of the at least one electric input signal, and the at least one auxiliary electric input signal, or corresponding transforms, or selected frequency ranges thereof, and B) to provide an estimate of a personalized own voice transfer function from said microphone of said auxiliary device to said at least one microphone of the hearing aid.

The signal processor may be configured to receive corresponding time segments of the at least one electric input signal, and at least one auxiliary electric input signal provided by a microphone of said auxiliary device, or corresponding transforms, or selected frequency ranges thereof, and to provide an estimate of a transfer function from said at least one microphone of said auxiliary device to said at least one microphone of the hearing aid.

Features of the hearing aid system as described above, in the detailed description of embodiments and in the claims may be combined with the hearing aid (where appropriate).

The hearing aid may comprise a beamformer filter configured to provide an own voice beamformer comprising personalized filter weights determined in dependence of said estimate of a personalized own voice transfer function. The own voice beamformer may be used in various applications where a good estimate of the speech of the user is needed, e.g. handsfree telephony, speech recognition (wake-word-, keyword detection), etc.

The hearing aid may comprise a beamformer filter configured to provide an own voice-cancelling beamformer comprising personalized filter weights determined in dependence of said estimate of a personalized own voice transfer function. The own voice-cancelling beamformer may be useful in situations where only sounds from the environment are of interest (e.g. to estimate noise during own voice pickup or to separate own voice from environment sound, etc.).

The hearing aid may comprise one or more own-voice related algorithms, e.g. a voice control interface and/or a keyword detector. The own-voice related algorithms may be optimized to voice from a particular physical user or an artificial voice, e.g. using a standard model, e.g. the Head and Torso Simulator (HATS) 4128C from Brüel & Kjær Sound & Vibration Measurement A/S, or the head and torso model KEMAR from GRAS Sound and Vibration A/S, or similar, e.g. a computer model of the acoustic propagation properties of a person. To do so, while still achieving the improvements of personalized processing, the microphone signal(s) from the at least one microphone of the hearing aid may be to pre-weighed (equalized) during signal segments where the own-voice signal dominates (e.g. as estimated using an own-voice detector). In particular, when operating the own-voice related algorithms during own-voice activity, the hearing aid (e.g. the signal processor) is configured to weigh the ith microphone signal $S_{mics,i}(k,l)$ according to $$S_{i,modif}(k,l) = d_{HATS,i}(k)/d_{o,i}(k) \cdot S_{mics,i}(k,l),$$

where $d_{o,i}(k)$ is the OVTF of the particular user estimated as described above, $d_{HATS,i}(k)$ is a set of OVTF coefficients as measured on a HATS or similar physical or artificial model (e.g. offline in a sound studio of the HA manufacturer, e.g. estimated as described above) and stored in a memory of (or accessible to) the hearing aid. $S_{mics,i}(k,l)$ denotes a time frequency representation (e.g. provided by a Fourier transform algorithm, e.g. STFT or DFT) of the own-voice signal recorded on the ith microphone, for the user in question. Thereby own-voice related algorithms of the hearing aid may be optimized to another voice than the user's own voice (and hence reused for different users), while still taking the acoustic propagation properties of the user's head and body into account.

The hearing aid may comprise one or more own-voice related algorithms, e.g. a voice control interface and/or a speech recognition algorithm, optimized to a voice from a particular physical person or to an artificial or recorded voice from a standard model, wherein—during signal segments where the own-voice signal dominates—the at least one microphone signal is equalized in dependence of own voice transfer functions for said particular person or said model and said user, respectively.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid comprises a signal processor, which may be configured to enhance the input signal(s) and to provide the processed signal.

The hearing aid may comprise an output unit for providing a stimulus perceived by the user as an acoustic signal based on a processed electric signal. The output unit may comprise an electrode-array of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may comprise a synthesis filter bank for converting a frequency domain signal to a time domain signal. The output unit may comprise a digital-to-analogue (DA) converter to convert a digital signal to an analogue output signal, e.g. for being presented to a user via an output transducer.

The hearing aid may comprise an input unit for providing the electric input signal representing sound. The input unit may comprise an input transducer, e.g. a microphone, for converting an input sound to an electric input signal. The input unit may comprise a wireless receiver for receiving a wireless signal comprising or representing sound (e.g. from the environment around the hearing aid) and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz). The input unit may comprise one or more analogue to digital converter(s) (as appropriate) for converting an analogue signal to a digitized signal with a certain sampling rate $f_s$. The input unit may comprise one or more analysis filter banks (as appropriate) for converting a time domain signal to a frequency domain signal.

The hearing aid may comprise a directional microphone system (beamformer) adapted to spatially filter sounds from the environment, and thereby e.g. enhance (or suppress) a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in the literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from a communication device (e.g. a smartphone), a wireless microphone, an entertainment device (e.g. a TV-set), or from another hearing aid. The direct electric input signal may represent or comprise an audio signal and/or a control signal and/or a status or information signal. The hearing aid may comprise demodulation circuitry for demodulating the received direct electric input to provide the direct electric input signal. In general, a wireless link established by antenna and transceiver circuitry of the hearing aid can be of any type. The wireless link may be based on near-field communication, e.g. an inductive link based on an inductive coupling between antenna coils of transmitter and receiver parts. The wireless link may be based on far-field, electromagnetic radiation.

The communication between the hearing aid and the other (e.g. auxiliary) device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may e.g. be based on a standardized or proprietary technology. The wireless link may e.g. be based on Bluetooth technology (e.g. Bluetooth Low-Energy technology).

The hearing aid may have a maximum outer dimension of the order of 0.08 m or of the order of 0.04 m.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer, such as a loudspeaker. The signal processor is located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, an own voice estimate, a predefined keyword, etc.). Some or all signal processing of the analysis path and/or the signal path may be conducted in the frequency domain. Some or all signal processing of the analysis path and/or the signal path may be conducted in the time domain.

The hearing aid may be configured to convert an analogue electric signal representing an acoustic signal to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n, n being a time index). Each audio sample may represent the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. A number of audio samples may be arranged in a time frame. A time frame may e.g. comprise 64 or 128 (or more) audio data samples. Other frame lengths may be used depending on the practical application.

The hearing aid may comprise a filter bank comprising an analysis filter bank providing a number of frequency sub-band signals from a time domain signal and a synthesis filter bank for providing a time domain signal from a number of frequency sub-band signals. The hearing aid, e.g. the input unit, and or the antenna and transceiver circuitry may comprise a time-frequency (TF)-conversion unit for providing a time-frequency representation of an input signal. The time-frequency representation may comprise an array or map of corresponding to complex or real values of the signal in question in a particular time- and frequency-range. The TF conversion unit may comprise an analysis filter bank for filtering a (time varying) input signal and providing a number of (time varying) output signals each comprising a distinct frequency range of the input signal (frequency sub-band signals). The TF conversion unit may comprise a Fourier transformation unit for converting a time variant input signal to a (time variant) signal in the (time-)frequency domain. The frequency range considered by the hearing aid from a minimum frequency &in to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid. A mode of operation may include a calibration mode, where head-related transfer functions of the user may be determined according to the present disclosure.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively, or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice activity detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector is configured to detect movement of the user's facial muscles and/or bones, e.g. due to speech or chewing (e.g. jaw movement) and to provide a detector signal indicative thereof.

The classification unit may be based on or comprise a neural network, e.g. a trained neural network, e.g. a recurrent neural network, e.g. a gated recurrent unit (GRU).

The hearing aid may further comprise other relevant functionality for the application in question, e.g. compression, noise reduction, feedback control, etc.

The hearing aid may comprise a hearing instrument, e.g. a hearing instrument adapted for being located at the ear or fully or partially in the ear canal of a user.

A First Further Hearing Aid:

In a further aspect, a hearing aid comprising a data-driven algorithm, e.g. a trained deep neural network (DNN) is provided. The neural network may e.g. comprise a recurrent neural network, e.g. a gated recurrent unit (GRU). The data-driven algorithm may be configured to implement an own-voice activity detector (OVAD). Other data-driven own-voice-relevant algorithms exist, e.g., keyword spotting algorithms, hands-free telephony related algorithms, etc.

Training of the data-driven algorithm is described in section "Application 3. Online Personalization of Own-Voice-Driven Algorithms" below.

Features of the hearing aid systems or hearing aids as described above, in the detailed description of embodiments and in the claims may be combined with the first further hearing aid (where appropriate).

A Second Further Hearing Aid:

In a further aspect, a hearing aid comprising a signal processor for applying a number of processing algorithms, possibly including data-driven algorithms, e.g. neural network algorithms, e.g. own voice processing algorithms (such as e.g. an own voice detection algorithm, a speech recognition algorithm, e.g. a keyword detection algorithm, etc.) is provided. The own voice processing algorithms of the hearing aid may be optimized for the same OVTF, e.g. based on standard model, e.g. a head and torso model (e.g. HATS or similar models). This is advantageous for development, debugging, maintenance, and logistics. Personalized own voice transfer functions for the user of the hearing aid may be used to modify (equalize) the microphone signals of the hearing aid, as described in section "Application 4. OVTF Equalization" below.

Features of the hearing aid systems or hearing aids as described above, in the detailed description of embodiments and in the claims may be combined with the second further hearing aid (where appropriate).

A Third Further Hearing Aid:

In a further aspect, a hearing aid for playing audio to a user via an output transducer of the hearing aid configured to apply head related transfer functions to audio signals either wirelessly received from another device or system or internally stored or generated audio signals (e.g. beeps or stored audio or audio generated in the hearing aid) before playing the audio to the user is provided. This has the advantage that e.g., phone calls, sound notifications, jingles, etc., may be perceived by the user as if they originated from a position outside the user's body. A combination of a set of measured personal HRTFs with a set of pre-measured HRTFs (e.g., from a model, e.g. HATS), for other directions not covered by the personal HRTF set may be used as described in section "Application 5. Acoustic Rendering using HRTFs" below.

Features of the hearing aid systems or hearing aids as described above, in the detailed description of embodiments and in the claims may be combined with the third further hearing aid (where appropriate).

A Hearing System Comprising a Headset:

In a further aspect, a hearing system comprising a headset and an auxiliary device is provided by the present disclosure. The headset is configured to be used instead of a hearing aid in the hearing aid system described above, in the detailed description of embodiments and in the claims.

The headset is adapted for being worn by a user at a or in an ear of the user. The headset is adapted to establish a communication link to an auxiliary device (e.g. a smartphone) to provide that data can be exchanged between them or forwarded from one to the other. The headset may further comprise an input unit comprising at least one microphone for picking up sound from the environment of the headset, including the user's own voice, and to provide corresponding at least one electric input signal representative of said sound, and an output unit, e.g. comprising a loudspeaker, for presenting stimuli perceivable as sound to the user. The headset may further comprise a signal processor configured to receive corresponding time segments of the at least one electric input signal, and at least one auxiliary electric input signal provided by a microphone of said auxiliary device, or corresponding transforms, or selected frequency ranges thereof, and to provide an estimate of an acoustic transfer function from a microphone of said auxiliary device to said at least one microphone of the headset. The input unit may comprise two or more microphones.

The headset may be configured to (via its input unit) pick up a user's own voice and transmit it to a far-end communication partner, and to receive sound from a far-end communication partner and present it to the user (via the output unit of the headset).

The input unit of the headset may comprise at least two microphones each providing an electric input signal. The microphones may be located at or in an ear of the user. The headset may comprise a beamformer filter comprising one or more beamformers by applying appropriate (predetermined or adaptively determined) filter weights to the at least two electric input signals. The one or more beamformers may comprise an own voice beamformer comprising personalized filter weights, the own voice beamformer being configured to enhance signals originating from the direction of the user's mouth and to suppress sound signals from other directions. The personalized filter weights may be determined in dependence of the estimate of transfer function(s) from said at least one microphone of said auxiliary device to said at least two microphones of the headset. The personalized own voice beamformer may be configured to provide an improved estimate of the user's own voice. The headset may—in a communication mode of operation—be configured to transmit the estimate of the user's own voice signal to another device, e.g. to an auxiliary device (e.g. a smartphone).

The auxiliary device, e.g. a smartphone, may comprise at least one microphone for picking up sound from the environment of the auxiliary device and for providing corresponding at least one auxiliary electric input signal representative of the sound. The auxiliary device may further comprise a user control interface allowing a user to initiate a specific calibration mode of operation of the hearing system. The auxiliary device may further comprise a loudspeaker for playing a test sound. The auxiliary device is adapted to establish a communication link to the headset to provide that data can be exchanged between them or forwarded from one to the other.

The headset and the auxiliary device may comprise antenna and transceiver circuitry allowing the communication link to be established between them.

The headset may comprise a single earpiece adapted to be located at a left and/or right ear of the user.

The headset may comprise left and right earpieces adapted to be located at left and right ears of the user, respectively. The left and right earpieces may be configured to establish a communication link allowing the exchange of data between them. The left and right earpieces may each comprise respective input and output units. The left and right earpieces may each comprise at least two microphones, e.g. located at or in each of the left and right ears (pinna).

Features of the hearing aid systems and corresponding methods as described above, in the detailed description of embodiments and in the claims may be combined with the present hearing system and headset (where appropriate).

Use:

In an aspect, use of a hearing aid system or a hearing system as described above, in the 'detailed description of embodiments' and in the claims, for determining personalized parameters of a processing algorithm of the hearing aid or headset. The processing algorithm may e.g. be or comprise a directionality algorithm, e.g. for providing a beamformed signal as a combination of a multitude of electric input signals from a multitude of microphones (e.g. from microphones of the hearing aid or headset).

In an aspect, use of a hearing aid or headset as described above, in the 'detailed description of embodiments' and in the claims, is moreover provided. Use may be provided for determining personalized parameters of a processing algorithm of the hearing aid or headset.

Use may e.g. be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid system (or a hearing system) is furthermore provided by the present application. The hearing aid system (or hearing system) comprising
- a hearing aid (or headset) adapted for being worn by a user at a or in an ear of the user, or for being fully or partially implanted in the head at an ear of the user, and
- a portable auxiliary device, e.g. a communication device, such as a smartphone, wherein the hearing aid system (or the hearing system) is adapted to establish a communication link between the hearing aid (or headset) and the auxiliary device to provide that data, e.g. control signals, status signals, and/or audio signals, can be exchanged between them or forwarded from one to the other.

The method comprises
- in the hearing aid (or headset)
  - providing by at least one microphone at least one electric input signal representative of sound from the environment of the hearing aid (or headset),
  - processing said at least one electric input signal, or a signal or signals derived therefrom, and providing a processed signal,
  - presenting stimuli perceivable as sound to the user representative of said processed signal,
- in the auxiliary device
  - providing by at least one microphone at least one auxiliary electric input signal representative of said sound from the environment of the hearing aid (or headset),
  - providing a user control interface allowing the user to initiate a specific calibration mode of operation of the hearing aid system (or the hearing system).

The method may further comprise: using corresponding time segments of said at least one electric input signal, and said at least one auxiliary electric input signal, or corresponding transforms or selected frequency regions thereof, to provide an estimate of a transfer function from said at least one microphone of said auxiliary device to said at least one microphone of said hearing aid (or headset).

The method may—in a specific own voice calibration mode of operation—comprise to position the auxiliary device in front of the mouth of the user. The method may comprise that the at least one microphone of the auxiliary device is located less than a maximum distance from the user's mouth. The maximum distance may e.g. be ≤0.2 m or less than 0.1 m. The method may comprise that the user is instructed about the location of the auxiliary device via the user control interface. The method may comprise that the user is instructed about one or more of a) the duration, b) the loudness (vocal effort), and c) the contents and/or type of the utterance that the user is expected to provide in the own voice calibration mode.

It is intended that some or all of the structural features of the hearing aid systems or hearing aids (or hearing systems or headsets) described above, in the 'detailed description of embodiments' or in the claims can be combined with embodiments of the method, when appropriately substituted by a corresponding process and vice versa. Embodiments of the method have the same advantages as the corresponding systems and devices.

The method may comprise—in said specific calibration mode of operation—playing a test sound signal to the environment by the auxiliary device in dependence of an input from said user control interface. The method may comprise transmitting the test sound signal from the auxiliary device to the hearing aid (or headset).

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing aid or a hearing aid system (or a headset or a hearing system) described above in the 'detailed description of embodiments', and in the claims. The APP may be configured to run on a cellular phone, e.g. a smartphone, or on another portable device allowing communication with said hearing aid or said hearing aid system.

The user interface may be configured to allow a user to control functionality of the hearing aid system, including an initiation of a specific calibration mode of operation of the hearing aid system or hearing aid.

The hearing aid system (including the APP) may be configured to allow a user to initiate a specific calibration mode of operation of the hearing aid system via the user interface. The hearing aid system (including the APP) may be configured to instruct the user via the user interface of the auxiliary device how to position the auxiliary device relative to the user in dependence of the selected calibration mode. In the own voice calibration mode, the user interface may be configured to instruct the user to position the auxiliary device so that the at least one microphone of the auxiliary device is located next to the mouth of the user. In the own voice calibration mode, the hearing aid system (including the APP) may be configured to instruct the user via the user interface of the auxiliary device to speak a certain phrase or sentence (e.g. with a particular vocal effort, e.g. loud or soft, etc., e.g. in dependence of a current noise level around the user) or for a specific or minimum duration. In the far-field calibration mode, the user interface may be configured to instruct the user to position the auxiliary device at a preferred location relative to the user (specifically to the hearing aid microphone(s) for which an (acoustic) transfer function is to be estimated), e.g. held in a hand, or on a stick, or located at or on a table or other support.

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing aid system' refers to a system comprising one or two hearing aids, and a 'binaural hearing aid system' refers to a system comprising two hearing aids and being adapted to cooperatively provide audible signals to both of the user's ears. Hearing aid systems or binaural hearing aid systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing aid systems or binaural hearing aid systems may e.g. be used for compensating for a hearing-impaired person's loss of hearing capability, augmenting or protecting a normal-hearing person's hearing capability and/or conveying electronic audio signals to a person. Hearing aids or hearing aid systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as beamforming, handsfree telephony, voice control, keyword spotting, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 3 shows a hearing aid system according to an embodiment of the present disclosure, and FIGS. 4A, 4B, and 4C together illustrate an exemplary application scenario of an embodiment of a hearing system according to the present disclosure, wherein

The figures are schematic and simplified for clarity, and they just show details which are essential to the understanding of the disclosure, while other details are left out. Throughout, the same reference signs are used for identical or corresponding parts.

Figure 1A:
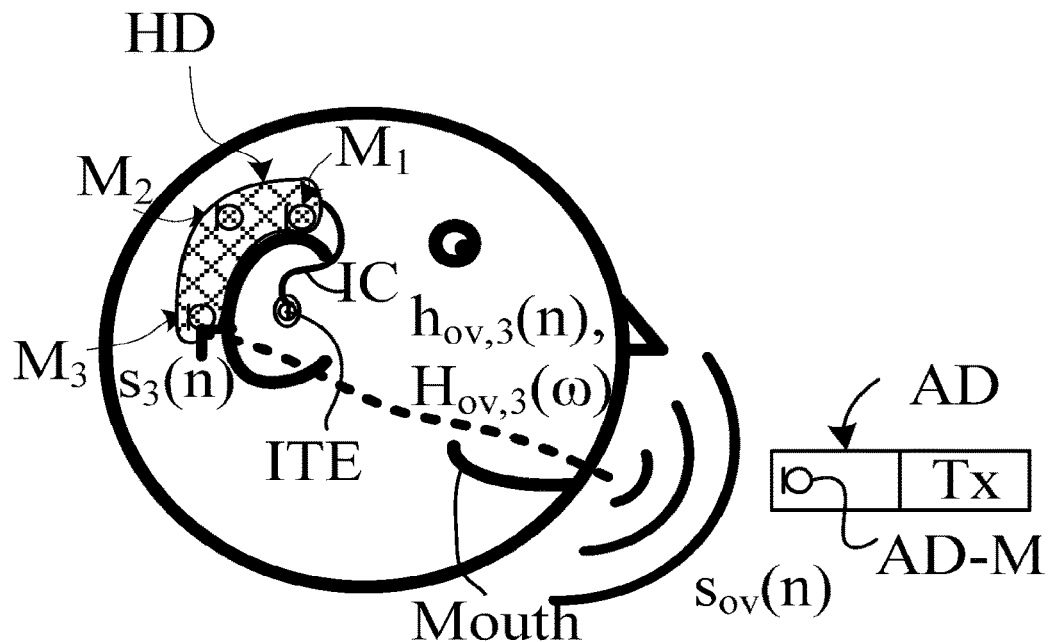
FIG. 1A illustrates a procedure for estimating own voice transfer functions (OVTFs) using a hearing aid system comprising a hearing aid and an auxiliary device, e.g. a mobile phone, during a calibration mode of the hearing aid system, wherein the user's own-voice signal $s_{ov}(n)$ is picked up by a microphone of the mobile phone and by microphones in the hearing aid (signals $s_i(n)$), and wherein the signals are used for estimating OVTFs $H_{ov,i}(\omega)$ (and relative OVFTs $d_{ov,i}(\omega)$)

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. It deals in particular to various aspects of retrieval and/or detection of a hearing aid user's own voice, e.g. in relation to beamforming and/or preservation or reestablishment of spatial cues.

Personal own voice transfer functions (OVTFs) may be estimated simply by using a portable electronic device, e.g. a mobile phone (or similar communication device comprising a microphone and a transmitter), or a wireless microphone. Imagine that the hearing aid (HA) system is in an OVTF estimation mode (calibration mode), e.g., triggered by the HA-user or a hearing care professional (HCP), e.g. via a user interface, e.g. an APP (e.g. of a mobile phone). In such calibration mode, the hearing aid system may be configured to prompt the HA user to place the mobile phone in front of his/her mouth and speak in a natural manner for some time, e.g. 1-10 seconds. For simplicity, the user may be asked to speak particular sound elements, e.g. a particular sentence (e.g. presented at the user interface, e.g. with a certain vocal effort, e.g. dependent on an environment noise level). For OVTF estimation the exact content of the speech signal is irrelevant. The OVTF estimation procedure should preferably take place in an otherwise acoustically quiet situation. This may be verified by the HA-system, e.g. the hearing aid(s), or the mobile phone, or a combination of both (or by a separate device), before initiating the estimation (calibration) procedure. Ideally, the user should be located away from reflecting surfaces, such as walls, etc., during calibration. Furthermore, ideally, the auxiliary device (e.g. a mobile phone) should be placed in a manner to reduce reflections from the phone surface to the microphones of the HA (e.g. by positioning it to have its largest surface, e.g. its display, in a horizontal plane, when the user is upright, cf. FIG. 1A).

FIG. 1A illustrates a procedure for estimating own voice transfer functions (OVTFs) using a hearing aid system according to the present disclosure. The hearing aid system comprises a hearing aid (HD) and an auxiliary device (AD), e.g. a mobile phone. FIG. 1A illustrates a calibration mode of operation of the hearing aid system, wherein the user's own-voice signal $s_{ov}(n)$ is picked up by a microphone (ADM) of the mobile phone (AD) and by microphones ($M_1$, $M_2$, $M_3$) in the hearing aid (providing signals $s_i(n)$, i=1, 2, 3, and wherein the signals are used for estimating frequency dependent OVTFs $H_{ov,i}(\omega)$ (i=1, 2, 3) from the HA-users' mouth (actually from the microphone of the phone (AD)) to the microphones of the HA-system (and possibly relative OVFTs $d_{ov,i}(\omega)$), where $\omega$ denotes (angular) frequency ($2\pi f$, where f is frequency). The hearing aid of FIG. 1A comprises a BTE-part adapted for being positioned at or behind pinna, and an ITE part adapted for being positioned at or in the user's ear canal. The two parts are connected by a connecting element (IC), e.g. an acoustic tube or an electric cable (or both).

The speech signal of the HA-user is picked up by the microphone(s) (ADM) in the phone (AD) and by the microphone(s) ($M_i$) in the users' HA(s) (HD). From these signals, the acoustic transfer function from the HA-users' mouth (actually from the microphone of the phone) to the microphones of the HA-system may be estimated. The user may wear a hearing aid at one ear or at both ears.

In more detail, let $s_{ov}(n)$ denote the own-voice time-domain signal picked up by a microphone in the mobile phone, placed at the mouth reference point, i.e., a position in front of (and close to) the HA-users' mouth. Furthermore, let $s_1(n), \ldots, s_M(n)$ denote the corresponding speech signals picked up by the M microphones of the HA (either in one HA at one ear, or in two HAs at both ears or in additional devices, e.g., a separate wireless microphone). Consider the Fourier transform of the picked-up signals and denote them by $S_{ov}(\omega)$ and $S_1(\omega), \ldots, S_M(\omega)$, respectively. Clearly, the acoustic transfer function from the mouth reference point to microphone i, i.e., the OVTF, is given by $$H_{o,i}(\omega) = \frac{S_i(\omega)}{S_{ov}(\omega)}.$$

In practice, $S_i(\omega)$ and $S_{ov}(\omega)$ are found by applying the Discrete Fourier Transform (DFT) to the microphone signals $s_{ov}(n)$ and $s_1(n), \ldots, s_M(n)$ leading to discrete acoustic transfer functions $$H_{ov,i}(k) = \frac{S_i(k)}{S_{ov}(k)}, k = 0, \ldots, K-1,$$

where k is the frequency bin index and K is the order of the DFT, e.g. 64 or 128.

For signal processing applications, it is often useful to collect the OVTFs for all microphones in one vector, $$H_{ov}(k) = [H_{ov,1}(k) \ldots H_{ov,M}(k)]^T.$$

It is often of relevance (see examples below) to consider relative OVTFs, defined as $$d_{ov,i}(k) = \frac{H_{ov,i}(k)}{H_{ov,i'}(k)}, k = 0, \ldots, K-1,$$

where $1 \leq i' \leq M$ is the index of a pre-selected reference microphone (one of the microphones in the HA system, e.g. a front microphone of a hearing aid), and to collect these in a relative OVTF vector, defined as $$d_{ov}(k) = [d_{ov,1}(k) \ldots d_{ov,M}(k)]^T.$$

In summary, OVTFs $H_{ov}(k) = [H_{ov,1}(k) \ldots H_{ov,M}(k)]^T$ and relative OVTFs $d_{ov}(k) = [d_{ov,1}(k) \ldots d_{ov,M}(k)]^T$ may be estimated from microphone signals $s_{ov}(n)$ and $s_1(n), \ldots, s_M(n)$. Note, when estimated in the manner described here, these OVTFs are personal, i.e., they reflect the personal acoustics (head shape, size, pinna, HA-location) of a particular HA-user. In practice, slightly more advanced, noise-robust, and data-efficient methods may be applied for estimating the OFTFs $H_{ov,i}(k)$ [Farina, 2000] rather than simply forming the ratio $H_{ov,i}(k) = S_i(k)/S_{ov}(k)$. The estimation procedure described above assumes that all relevant signals are available for processing in one place—so we assume that the relevant signals are transmitted (e.g. wirelessly), e.g. from the mobile phone to the hearing aid system (or elsewhere).

Figure 1B:
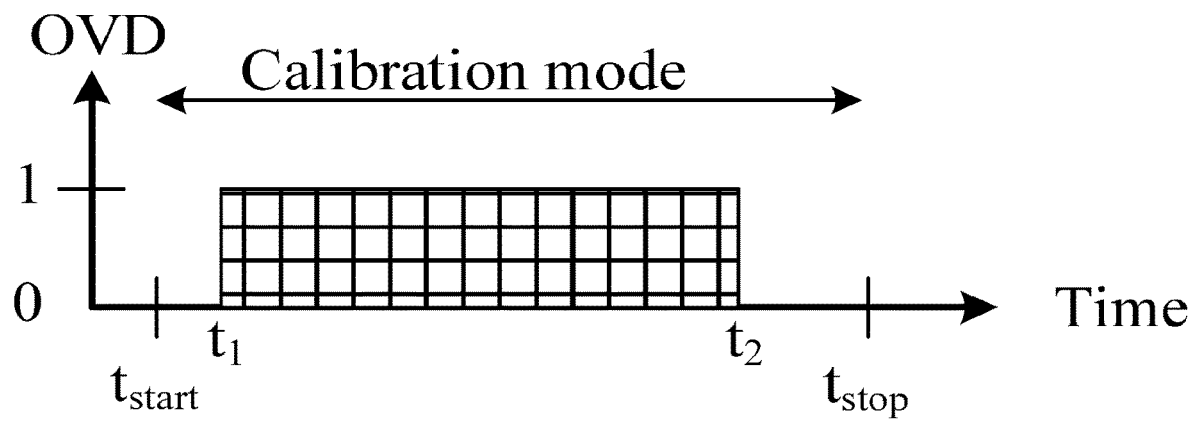
FIG. 1B illustrates a time dependence of an own voice control signal during a calibration mode from a start time $t_{start}$ to a stop time $t_{stop}$.

FIG. 1B illustrates a time dependence (Time) of an own voice control signal (OVD) during a calibration mode from a start time $t_{start}$ to a stop time $t_{stop}$. The own voice control signal is equal to 1 indicating a presence of the user' own voice (or a presence with a probability above a certain (e.g. first) threshold) in a time range between $t_1$ and $t_2$ within the calibration period (between $t_{start}$ and $t_{stop}$) and equal to 0 indicating an absence of the user' own voice (or a presence with a probability below a certain (e.g. second) threshold) in the calibration period outside the time range [$t_1$; $t_2$].

Similarly, it is of interest to estimate the (relative) acoustic transfer function from the typical position of a conversation partner (or a competing speaker) to the microphones of the HA—we denote this acoustic transfer function as the frontal head-related transfer function (HRTF). Estimation of this HRTF may be done using a mobile phone as a wireless loudspeaker. EP2928215A1 describes the use of an auxiliary device (e.g. a mobile telephone) for self-calibration of beamformers for retrieving non-own-voice sound sources of interest.

Imagine that the HA system is in a (frontal) HRTF estimation mode, e.g. triggered by the HA-user or a hearing care professional (HCP) via an APP. The user holds the mobile phone in a frontal position at an arm's length distance (the typical position of a conversation partner) at a height corresponding to the users' mouth, the loudspeaker of the mobile telephone emits a test sound signal $s_f(n)$ from its speaker, and the probe signal is picked up by the microphones of the HA-system worn by the user (cf. FIG. 2).

Figure 2:
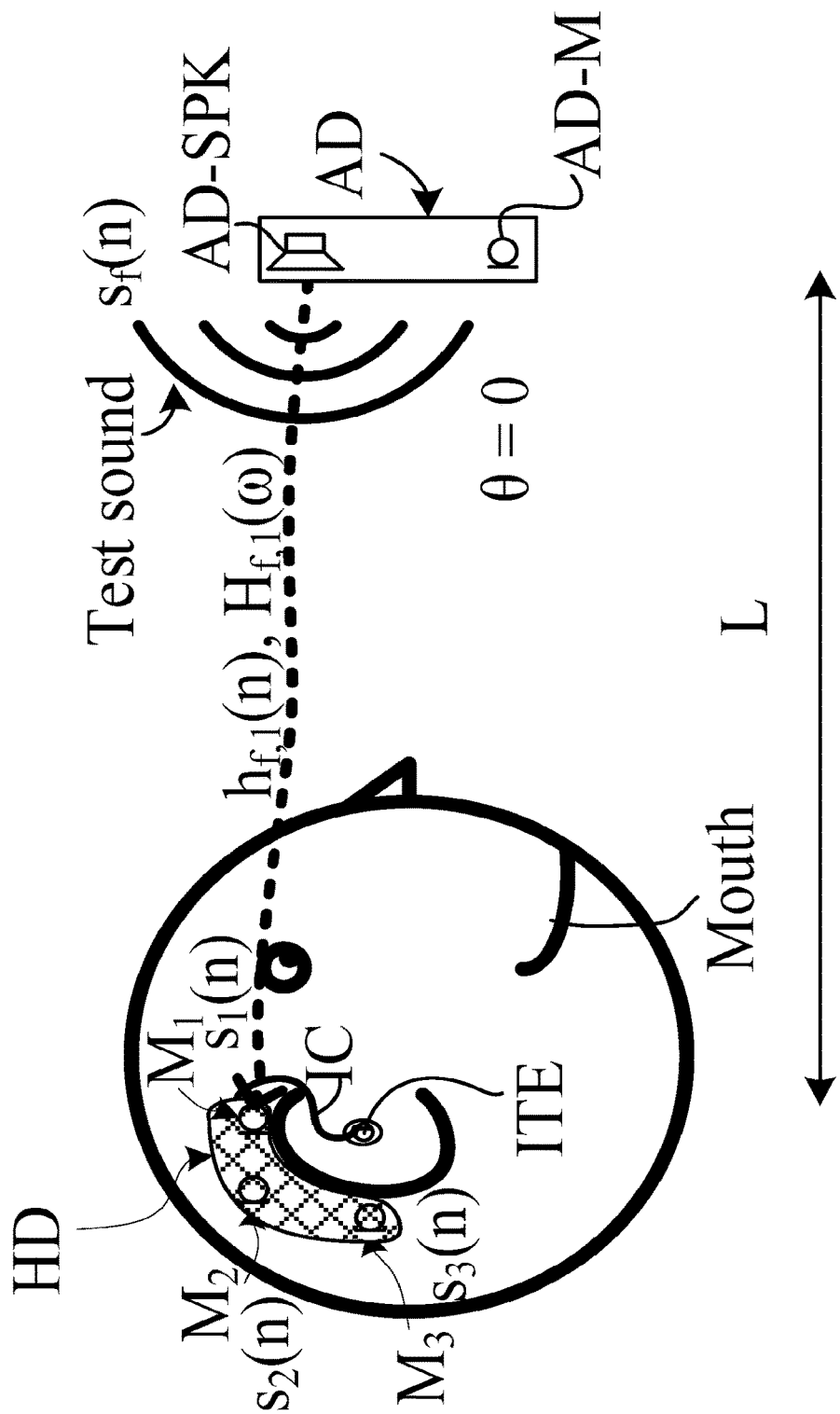
FIG. 2 illustrates a procedure for estimating (frontal) HRTFs using an auxiliary device, e.g. a mobile phone, wherein a test sound signal $s_f(n)$ is emitted from a loudspeaker of the mobile phone, and the resulting sound signals $s_i(n)$ are picked up by the HA microphones.

FIG. 2 illustrates a procedure for estimating (frontal) HRTFs using an auxiliary device (AD), e.g. a mobile phone, wherein a test sound signal ('Test sound', $s_f(n)$) is emitted from a loudspeaker (AD-SPK) of the mobile phone (AD) and the resulting sound signals ($s_i(n)$) are picked up by the HA microphones (M$_i$, i=1, 2, 3). Based on the emitted and received signals, acoustic transfer functions H$_{f,i}$(ω) (i=1, 2, 3) (or corresponding impulse responses h$_{f,i}$(n)) may be estimated.

A camera of the mobile phone may be used to give feedback to the user, that the mobile phone is in the correct position (e.g. according to a predefined criterion). The duration of the test sound signal could be ranging from a few 100 ms to several seconds (e.g. in the range between 1 s and 10 s; the longer the duration, the more accurately the HRTF may be estimated, but the higher the risk that the user is unable to hold the mobile phone or his or her head still). The exact content of the test sound signal is less important, as long as the signal contains energy at all relevant frequencies (e.g. speech frequencies). Ideally, the estimation procedure takes place in an otherwise acoustically quiet situation and in a room without too many reflections, e.g. in a room with soft carpets, curtains, etc. Even if the measurement takes place in a reflective environment, the late reflections may be removed from the estimated impulse response (IR) by truncation of the 'reverberant' IR tail.

In an embodiment the phone is mounted in a selfie stick. Based on a correlation (e.g. estimated by the hearing aid system, e.g. the hearing aid or the auxiliary device) between the hearing aid microphones and the microphone of the mobile phone, the length of the selfie stick may be adjusted such that a desired distance between the hearing instrument microphones and the phone in front of the user is obtained.

In the setup of FIG. 2, the distance between the hearing aid (HD, and its microphones, M$_1$, M$_2$, M$_3$) and the auxiliary device (AD, and its loudspeaker, AD-SPK) is indicated (L). It may e.g. be determined by a distance sensor, e.g. a light sensor, e.g. a camera, e.g. located in the auxiliary device) or the by (a predetermined) length of an arm or a selfie-stick). The hearing aid (HD) may be of any style, e.g., as shown in FIG. 2, comprising a BTE-part adapted for being located behind an ear (pinna) of the user and an ITE-part (ITE) adapted for being located at or in an ear canal of the user. The two parts are connected (e.g. mechanically (e.g. acoustically) and/or electrically) by an interconnecting element (IC). In the embodiment of FIG. 2, the BTE-part comprises three microphones (M$_1$, M$_2$, M$_3$), but other numbers maybe relevant. Two of the three microphones are (intended to be) located in a horizontal plane when the user is in an upright position to allow beamforming in an expected direction of a communication partner. By having a microphone located outside the horizontal plane, more options for beamforming are provided, e.g. in a direction of the user's mouth, e.g. for picking up the voice of the user.

The user may (e.g. via the user interface, e.g. via the auxiliary device) initiate the (calibration) measurement, when the auxiliary device is located in an intended position relative to the user. The measurement may also be initiated when a certain distance is obtained (as e.g. determined by a distance sensor). Hereby the user does not have to actively initiate the measurement.

In an embodiment, the user is notified prior to the beginning of the measurement (to achieve that the user is not moving during the measurement). Notification may happen via the phone screen, by audio from the phone, or via audio played via the output unit of the hearing aid. This has the advantage that the user becomes aware not to move.

As before, let s$_1$(n), . . . , s$_M$(n) denote the corresponding signals picked up by the microphones of the HA-system. Now the frontal HRTF H$_{f,i}$(k) from the mobile phone to the ith microphone, and the frontal relative HRTF d$_{f,i}$(k)=H$_{f,i}$(k)/H$_{f,i}$(k) can be estimated exactly as in the discussion in connection with FIG. 1A, 1B, but where the own-voice signal s$_o$(n) is replaced by the test sound signal s$_f$(n) generated by the mobile phone. The resulting frontal HRTF vector is denoted as $$H_f(k)=[H_{f,1}(k) \ldots H_{f,M}(k)]^T,$$

and the relative frontal HRTF is denoted as $$d_f(k)=[d_{f,1}(k) \ldots d_{f,M}(k)]^T.$$

In practice, the (relative) HRTF may be estimated using slightly more complicated procedures than described in the previous section. Specifically, it may be beneficial that the test sound signal is a chirp signal (a tonal signal whose frequency increases with time); in this case, the HRTF may be estimated using the procedure outlined in [Farina, 2000].

The HRTFs may be measured for multiple sound source positions (angles), not only the frontal. Clearly, it is hard for a person to hold a mobile phone in her hand at an angle of, say, 25 degrees wrt. his/her nose direction. However, the hearing aid system may be configured to provide that the auxiliary device (e.g. the phone) delivers feedback to the user (e.g., via the loudspeaker or the screen) if/when the phone is held in the correct position. This may be achieved using the camera of phone (e.g. based on a user input regarding the position of interest, e.g. selected among a number of predefined positions, e.g. via the user interface). Once in the correct position, the phone emits the test sound signal and measures the HRTF as described above. This process could be repeated for a range of front-half-plane locations of the mobile phone.

EXAMPLES

Application 1. Personalized Own-Voice Beamformer/Noise Reduction System

This application uses the OVTFs d$_o$(k)=[d$_{o,1}$(k) . . . d$_{o,M}$(k)]$^T$ estimated as described above.

For an application such as handsfree telephony in HAs and voice-controlled HAs, it is essential to be able to retrieve (an estimate of) a clean version of the users' speech signal, even in acoustically noisy situations. In order to do so, one can design beamforming systems based on the microphone signals of the HA system in order to enhance signals originating from the direction of the users' mouth and suppress sound signals from other directions.

For example, it is well-known that the filter coefficients of a Minimum Variance Distortion-Less Response (MVDR) beamformer are given by $$w(k, l) = \frac{C_v^{-1}(k, l)d(k)}{d^H(k)C_v^{-1}(k, l)d(k)},$$

where C$_v$(k,l) denotes the cross-power spectral density matrix at frequency k and time instant l (see e.g. [Jensen et al., 2015] and the references therein for methods for estimating C$_v$(k,l)), and where d(k) is the relative acoustic transfer function from a sound source of interest to microphones providing input to the MVDR-beamformer.

Inserting the estimated OVTF vector, d$_o$(k), into this expression leads to a personalized own voice beamformer, $$w_o(k, l) = \frac{C_v^{-1}(k, l)d_o(k)}{d_o^H(k)C_v^{-1}(k, l)d_o(k)},$$

which leads to a better own-voice retrieval/noise reduction trade-off than when using a non-personalized d(k), e.g. as estimated from a Head-And-Torso Simulator (HATS). Alternative own-voice retrieval systems easily follow, e.g. based on the Multi-Channel Wiener Filter, Delay-and-Sum Beamformer [Brandstein et al., 2001], Beamformer-Informed Postfilter solutions [Jensen et al., 2015], etc.

Application 2. Personalized Own-Voice Beamformer with Frontal Interference Rejection This application uses the OVTFs $d_o(k)=[d_{o,1}(k) \ldots d_{o,M}(k)]^T$ estimated as described above, together with the frontal HRTFs $d_f(k)=[d_{f,1}(k) \ldots d_{f,M}(k)]^T$ estimated as described above.

The idea is an extension of the idea described in section 'Application 1' above, where, in addition to retrieving the users' own voice signal, a spatial null is directed towards the frontal direction, in order to maximally suppress a presumed competing speaker. It is well-known that a beamformer, which can perform this task is a special case of a Linear Constrained Minimum Variance (LCMV) beamformer. The beamformer coefficient vector is found by solving the problem $$\min_w w^H(k,1)C_V(k,l)w(k,1)$$

subject to the constraints $$w^H(k,l)d_o(k)=1,$$

and $$w^H(k,l)d_f(k)=0.$$

It is well-known that this problem obeys a simple, closed-form solution [Haykin, 2001].

Alternatives to the LCMV beamformer solution exist—for example, it is straightforward to extend it with a postfilter.

Application 3. Online Personalization of Own-Voice-Driven Algorithms

This application uses the OVTFs $d_o(k)=[d_{o,1}(k) \ldots d_{o,M}(k)]^T$ estimated as described above and assumes (optionally) that a batch of the users' own voice is recorded with the HA-microphones. An extension of the idea also uses the (frontal) HRTF $d_f(k)=[d_{f,1}(k) \ldots d_{f,M}(k)]^T$ estimated as described above.

Assume that a data-driven algorithm is present in the HA-system. Such algorithm could typically involve a deep neural network (DNN) trained to solve a relevant task. In the example below, we assume that this algorithm is an own-voice activity detector (OVAD), but this is only an example—other data-driven own-voice-relevant algorithms exist, e.g., keyword spotting algorithms, hands-free telephony related algorithms, etc.

Assume, for example, that the OVAD is based on a deep neural network (DNN), which is trained to classify each time-frequency tile in the input signal as a) own-voice dominated, b) not own-voice dominated (comprising background noise, external talkers, silence, etc.), cf. e.g. [Garde, 2019]. An OVAD serves as a pre-requisite for other algorithms, e.g., algorithms for estimating the noise cross-power spectral density matrix $C_v(k,l)$, etc., cf. e.g. [Garde, 2019]. Traditionally, the training of such DNN-OVAD takes place off-line, i.e., prior to HA-usage, using speech signals uttered by many different speakers (males, females, children) and recorded by HAs on their individual ears. The resulting OVAD-algorithm works well on average across a group of representative users—this is a speaker-independent algorithm.

However, given access to the personal OVTF $d_o(k)$ along with examples of speech from the user in question, the DNN may be re-trained (or trained further, aka transfer learning) online, i.e., during HA usage, using artificially generated own-voice microphone signals. Specifically, the artificial own-voice signals may be generated according to $$S_i(k,l)=d_{o,i}(k) \cdot S_o(k,l),$$

where $S_i(k,l)$ is the Short-Time Fourier Transform of the artificial personalized own-voice signal recorded at microphone i, $d_{o,i}(k)$ is the OVTF estimated as described above, and $S_o(k,l)$ is the STFT of the recording of the users' own voice. Time-domain versions of the artificial own-voice microphone signals may be constructed by applying the inverse STFT to the STFT-signals. If a recording of the users' own voice is not available, a collection of other speech signals may be used, e.g. from speakers of the same gender as the user, if such information is available. In this situation, the data-driven algorithm will be personalized in terms of OVTFs but not in terms of the users' voice characteristics.

Re-training (or continued training) of a DNN during HA-usage may be hard due to memory and computational complexity limitations of the HA. One could bypass this problem by transmitting the relevant data (OVTFs and optional own voice signals and optional DNN parameters) wirelessly to an external computational unit, which, after re-training, would transmit the resulting DNN weights back to the HA-system.

As already mentioned, the presented idea of using the OVTFs and (optionally) recordings of the users' own voice is not limited to the OVAD example described above, but may be applied to personalize any data-driven algorithm onboard the HA.

An extension of the idea involves including a frontal competing speaker in the artificially generated training data. In particular, noisy own-voice signals may be generated according to $$X_i(k,l)=d_{o,i}(k) \cdot S_o(k,l)+d_{f,i}(k) \cdot S_f(k,l)+V(k,l),$$

where $d_{f,i}(k)$ are (frontal) HRTFs, e.g. measured as described in Sec. 2.2, $S_f(k,l)$ is the STFT of the voice signal of a competing speaker, and V (k,l) is an arbitrary noise signal representing non-coherent noise sources in the acoustic environment. The competing speech signal $S_f(k,l)$ could be generated from arbitrary speech signals from a large quantity of male and female speakers (as the competing speaker is generally unknown in practice), and V (k,l) could be generated from relevant acoustic noise, e.g., noise from a cafeteria situation or a passenger-in-a-train situations, etc. as recorded by the HA-microphones on a HATS. It is assumed that signals $S_f(k,l)$, and V (k,l) are present in an external computational device, where (re-)training of the network weights take place.

Application 4. OVTF Equalization

The idea uses the OVTFs $d_o(k)=[d_{o,1}(k) \ldots d_{o,M}(k)]^T$ estimated as described above.

One approach to realize personalized own-voice processing is by modifying the actual signal processing algorithms taking place in the HA-system, e.g. (re-)training DNN weights to fit personal head acoustics (example 3) or modifying beamformer weights to reflect personal head- and torso-acoustics. It may, however, be desirable to maintain the same signal processing algorithm implementations (including DNN weights) for all users (such processing algorithms may include own-voice-relevant algorithms, e.g. an own voice detection algorithm, a speech recognition algorithm, e.g. a keyword detection algorithm, etc.). In particular, it would be desirable, if the own voice processing algorithms on-board the HA system were optimized for the same OVTF, e.g. the one of a HATS—this would make system development, debugging, maintenance, and logistics easier.

To do so, while still achieving the improvements of personalized processing, we propose to pre-weigh or equalize the microphone signals during signal regions where the own-voice signal dominates (e.g. as estimated using an OVAD). In particular, when operating the own-voice related algorithms during own-voice activity, we propose to weigh the ith microphone signal $S_{mics,i}(k,l)$ according to $$S_{mics,i}(k,l)=d_{HATS,i}(k)/d_{o,i}(k)\cdot S_{mics,i}(k,l),$$

where $d_{o,i}(k)$ is the OVTF of the particular user estimated as described above, $d_{HATS,i}(k)$ is a set of OVTF coefficients as measured on a HATS (offline in a sound studio of the HA manufacturer, e.g. estimated as described above) and stored in the HA memory, and $S_{mics,i}(k,l)$ denotes the STFT of the own-voice signal recorded on the ith microphone, for the user in question.

The proposed equalization scheme transforms the own-voice microphone signals of a particular user, to the own-voice microphone signals of a HATS. This allows the subsequent processing applied in the HA-system to be optimized for a HATS, irrespective of the actual user. In other words, the processing after the equalization would be identical for all users.

Application 5. Acoustic Rendering Using HRTFs

The idea uses the (frontal) absolute HRTF $H_f(k)=[H_{f,1}(k) \ldots H_{f,M}(k)]^T$, estimated as described above. Optionally, the idea uses the frontal HRTF in addition to absolute HRTFs measured from other directions than the frontal.

We propose to combine the set of measured personal HRTFs with a set of pre-measured HRTFs (e.g., from a HATS), for other directions not covered by the personal HRTF set. We propose to use the combined set of HRTFs for spatially realistic rendering of acoustic signals for the user of a hearing device. In particular, the combined HRTF set makes it possible to play back sounds of interest for the user, e.g., phone calls, sound notifications, jingles, etc., as if they originated from a position outside the users body, e.g., in the frontal position, or slightly to the left, etc., or to render an ambient signal more realistically, using more or all HRTFs in the combined set.

Specifically, without loss of generality, let i=1 denote the index of a HA-microphone close to the left eardrum of the user, and let i=2 denote the index of a HA-microphone close to the right eardrum of the user. Also, still without loss of generality, let us consider rendering a sound source as originating from the frontal position (for example). Hence, $H_{f,1}(k)$ denotes the acoustic transfer function from a position in front of the user to her left ear, while $H_{f,2}(k)$ denotes the acoustic transfer function from the same position in front of the user to her right ear.

Then a sound of interest for the user may be rendered as originating from the front according to $$S_i(k,l)=H_{f,i}(k)S(k,l), \; i=1,2,$$

where $S(k,l)$ is the STFT of the sound of interest, while $S_1(k,l)$ and $S_2(k,l)$ is the STFT of the signal present to the left and right ear, respectively, of the user.

This approach may be generalized to the synthesis of more complex sound fields according to $$S_i(k,l) = \sum_j H_{j,i}(k)S_j(k,l), \; i=1,2,$$

where $S_j(k,l)$ is the STFT of the component of the sound of interest originating from location j, $H_{j,i}(k)$ is the (personalized or HATS-based) HRTF from location j to the microphone close to the ith ear, and $S_i(k,l)$ is the STFT of the sound to be presented to the ith ear. The location index j, could span some or all HRTFs in the combined HRTF set (i.e., both personal and HATS-based HRTFs). The advantage of including personal HRTFs over using all-HATS-based HRTFs is that the spatial sound perception becomes more realistic to the individual user.

Figure 3:
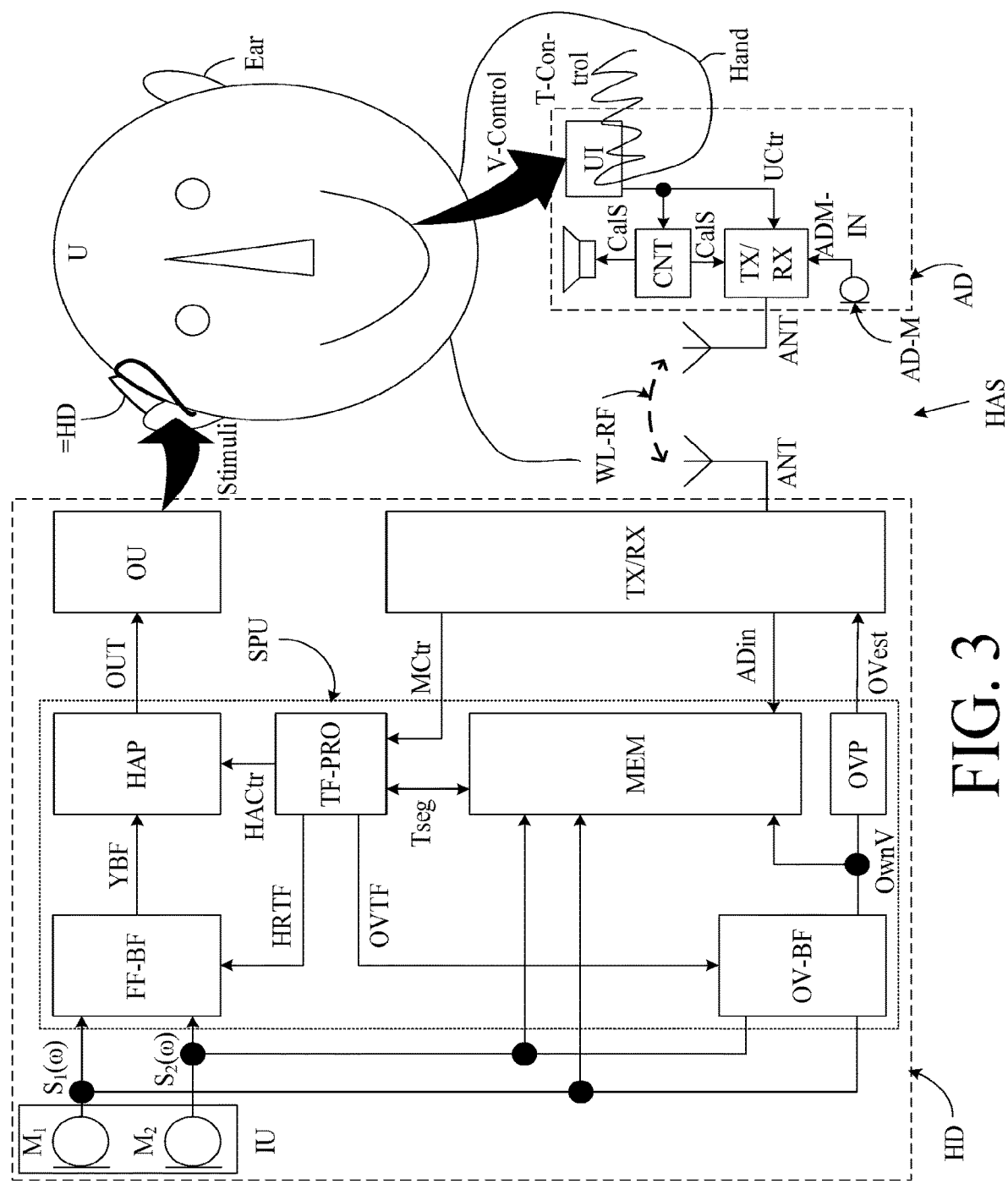

FIG. 3 shows a hearing aid system according to an embodiment of the present disclosure. The hearing aid system (HAS) comprises a hearing aid (HD) adapted for being worn by a user (U) at or in an ear of the user, or for being fully or partially implanted in the head at an ear of the user. The hearing aid system (HAS) further comprises a portable or wearable auxiliary device (AD), e.g. a communication device, such as a smartphone, or a similar device, and/or an application program (APP) configured to be executed on the auxiliary device (cf. FIG. 4A, 4B). The hearing aid system (HAS) is adapted to establish a communication link (WL-RF) between the hearing aid (HD) and the auxiliary device (AD) to provide that data can be exchanged between them or forwarded from one to the other.

The hearing aid (HD) comprises an input unit (IU) comprising at least one microphone (here two, $M_1$, $M_2$) for picking up sound from the environment of the hearing aid and to provide corresponding at least one electric input signal ($S_1(\omega)$, $S_2(\omega)$) representative of the sound (where $\omega$ may represent frequency). The input unit (IU) may comprise analogue to digital converters to provide the electric input signal(s) in digitized form as digital samples, and analysis filter banks for providing the electric input signal(s) as frequency sub-band signals, as appropriate for the application in question. The hearing aid (HD) further comprises a signal processor (SPU) configured to perform processing in the hearing aid. The signal processor (SPU) may comprise a hearing aid processor part (HAP) that is configured to process the at least one electric input signal or a signal or signals derived therefrom and to provide a processed signal (OUT). The hearing aid (HD) further comprises an output unit (OU), e.g. comprising a loudspeaker, a vibrator, or a multi-electrode array, for presenting stimuli (e.g. acoustic vibrations or electric stimuli) perceivable as sound to the user representative of the processed signal (OUT), see solid arrow denoted 'Stimuli' in FIG. 3 from the output unit (OU) to the user (U). The signal path from the input unit to the output unit (via hearing aid processor part (HAP)) may be denoted the 'forward path' in the hearing aid.

The auxiliary device (AD) comprises at least one microphone (AD-M) for picking up sound from the environment of the auxiliary device (AD) and to provide corresponding at least one auxiliary electric input signal (ADM-IN) representative of the sound. The auxiliary device (AD) further comprises a user control interface (UI), e.g. a keyboard of a touch sensitive screen, allowing a user (U) to initiate a specific calibration mode of operation of the hearing aid system (HAS), see solid arrow denoted 'V-Control' and symbolic hand denoted 'T-control' in FIG. 3 from the user (U) to the user interface (UI) of the auxiliary device (AD). As indicated in the embodiment of FIG. 3, the user control interface (UI) may comprise a touch sensitive display e.g. operated by one or more fingers (a stick, or the like) of the user (cf. 'T-Control' provided by the finger(s) of a hand of the user), and/or it may comprise a voice control interface reacting to spoken commands (cf. bold arrow denoted 'V-Control' from the user's mouth to the user interface (UI)).

The embodiment of a hearing aid system in FIG. 3 comprises a memory (MEM) (here located in the hearing aid) for storing a time segment of each of the at least one electric input signals (here signals ($S_1(\omega)$, $S_2(\omega)$)). The memory (MEM) is also configured to store a time segment of the at least one auxiliary electric input signal (ADM-IN) represented by signal (ADin) received from the auxiliary device (AD) via wireless communication link (WL-RF), e.g. based on Bluetooth or similar technology. The communication link is implemented by respective antenna and transceiver circuitry (TX/RX, ANT) of the two devices.

The signal processor (SPU) of the hearing aid (HD) is configured to compare corresponding time segments of the at least one electric input signal ($S_1(\omega)$, $S_2(\omega)$), and the at least one auxiliary electric input signal (ADin), or corresponding transforms thereof, and to provide an estimate of a transfer function (HRTF, OVTF) from the auxiliary device (AD) (e.g. from the at least one microphone (ADM) or from a loudspeaker (AD-SPK) of the auxiliary device, see below) to the at least one microphone ($M_1$, $M_2$) of the hearing aid (HD). In the embodiment of FIG. 3, this task is performed by controller (TF-PRO) that receives a mode control signal (MCtr) from the user interface (UI) of the auxiliary device via the communication link (WL-RF). In the calibration mode of operation of the hearing aid system, the controller (TF-PRO) is configured to compare corresponding time segments (Tseg) of electric input signals and based thereon to determine relevant acoustic transfer functions of the system, as described in detail above. As outlined and exemplified above these acoustic transfer functions may e.g. be own voice transfer functions (OVTF) from the user's mouth to each of the microphones ($M_1$, $M_2$). The own voice transfer functions (OVTF) may e.g. be used for customizing (personalizing) an own voice beamformer (OV-BF) of a beamformer filter that may be used to provide an estimate a user's voice (OwnV) based on the two electric input signals $S_1(\omega)$, $S_2(\omega)$ from the respective microphones ($M_1$, $M_2$) of the hearing aid (HD), e.g. for use in a (subsequent) telephone mode of operation (cf. e.g. FIG. 5), where the estimate of the user's own voice is transmitted to a telephone (here e.g. the auxiliary device) for further transmission to a far-end-receiver via a communications network (e.g. a PSTN, or an Internet-based service, e.g. Skype, or WhatsApp). In the embodiment of FIG. 3, the estimate of the user's voice (OwnV) is further processed (e.g. subject to a noise reduction algorithm, e.g. a post-filter) in processor part (OVP) providing an improved estimate of the user's own voice (OVest). In the embodiment of FIG. 3, the improved estimate of the user's voice (OVest) is transmitted to the far-end-receiver. The estimate of the user's voice may also be used in a keyword detector, e.g. in the hearing aid to support a voice control interface, or e.g. to control functionality of the auxiliary device, or for being verified by a processor in the auxiliary device, or for being transmitted to a server (e.g. in the Cloud) for further processing.

When the at least one microphone (ADM) of the auxiliary device (AD) is positioned in proximity of, e.g. in front of, the user's mouth (as e.g. described in connection with FIG. 1A), a transfer function may represent an own voice transfer function (OVTF), when the user—during the calibration mode of operation of the hearing aid system—raises his or her voice, e.g. speaks (see time segment [$t_1$; $t_2$] in FIG. 1B). The hearing aid system may be configured to instruct the user—e.g. via the user interface (UI) of the auxiliary device (AD) (cf. e.g. FIG. 4B)—to speak a certain phrase or sentence (e.g. with a particular vocal effort, e.g. loud or soft, etc., and/or of a specific duration, e.g. in dependence of a current noise level around the user).

The mode control signal (MCtr) from the user interface (UI) may e.g. be used to control the hearing aid signal processor (HAP) of the forward path of the hearing aid (HD) between the input unit (IU) and the output unit (OU), cf. control signal HActr. In the embodiment of FIG. 3, the forward path further comprises a beamformer filter comprising a (far-field) beamformer (FF-BF) allowing a beamformed signal (YBF) focusing on a (far-field) communication partner (e.g. 1 m or more away from the user's head (hearing aid(s))). The (far-field) beamformer is connected to the hearing aid signal processor (HAP), which e.g. applies one or more processing algorithms to the beamformed signal (YBF) (or a signal derived therefrom) and provides the processed signal (OUT), which is fed to the output unit (OU) for presentation to the user. The one or more processing algorithms may e.g. comprise one or more of noise reduction, compressive amplification (to compensate for the user's hearing impairment), feedback control, etc.

A customization (personalization) of the filter weights of the (far-field) beamformer (FF-BF) to the particular user may be performed (as described and exemplified in detail above) by the present embodiment of a hearing aid system using a loudspeaker of the auxiliary device to play a test sound (calibration sound) in a specific calibration mode whose aim it is to determine head related transfer functions (HRTF, cf. e.g. FIG. 2), instead of own voice transfer functions (OVTF, cf. e.g. FIG. 1A).

Figure 4A:
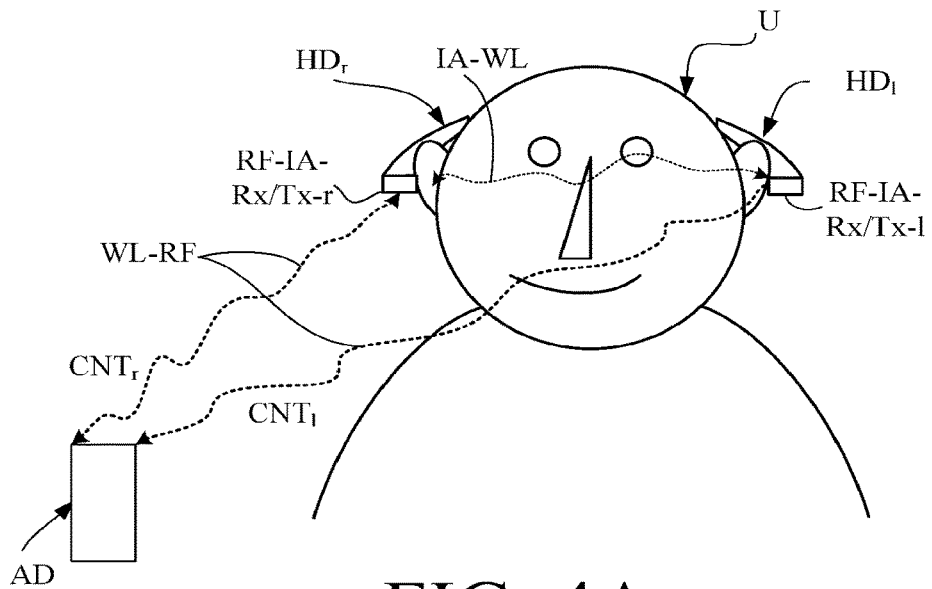
FIG. 4A illustrates a user, a binaural hearing aid system and an auxiliary device during a calibration procedure of the noise reduction system.
Figures 4B, 4C:
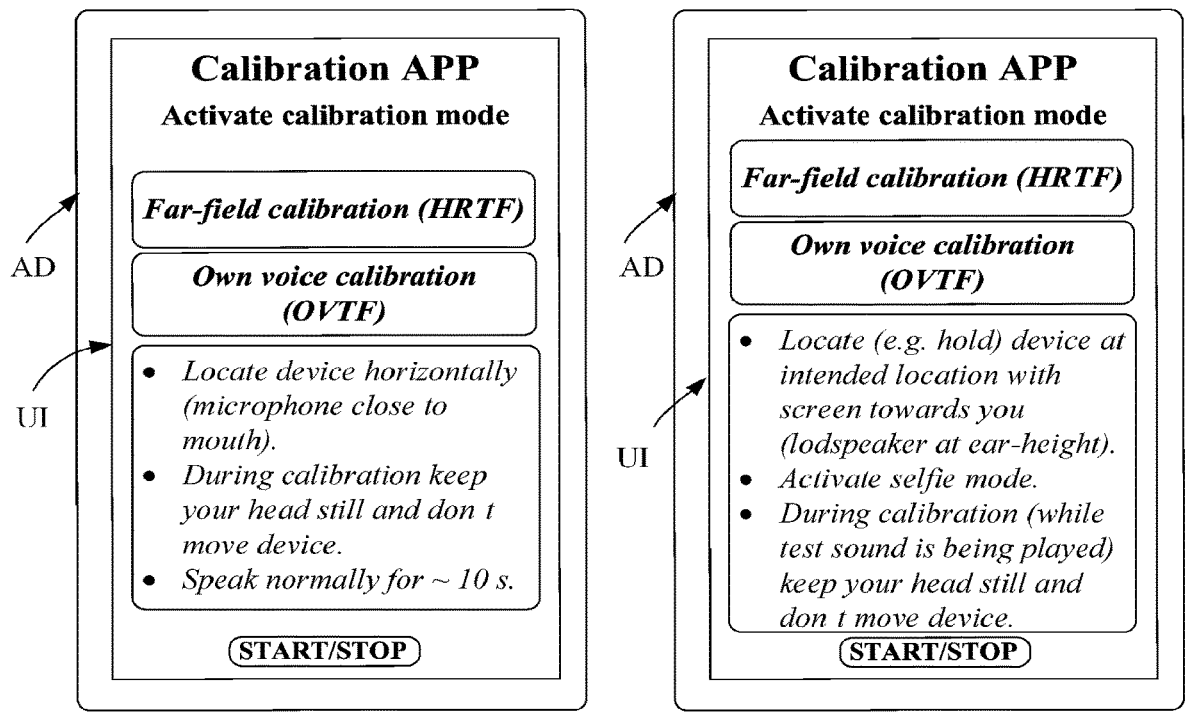
FIG. 4B illustrates the auxiliary device running an APP for initiating the calibration procedure for personalizing own voice transfer functions.
FIG. 4C illustrates the auxiliary device running an APP for initiating the calibration procedure for personalizing head related transfer functions.

The auxiliary device (AD) may thus (in an embodiment) preferably comprise a loudspeaker (AD-SPK) and the auxiliary device may be configured to—in a specific calibration mode of operation—play a test sound signal (cf. 'test sound, $s_t(n)$ in FIG. 2) to the environment of the auxiliary device via said loudspeaker in dependence of an input from the user control interface (UI), cf. e.g. FIG. 4C.

In the calibration mode, the auxiliary device is positioned at a preferred location relative to the user (hearing aid microphone(s)) from which an (acoustic) transfer function is to be estimated, e.g. held in a hand, or located at a table or other support. The preferred location (e.g. distance to, angle to, etc.) relative to the user may be known in advance (e.g. carrying auxiliary device on a stick (e.g. a 'selfie-stick') of known length), or be estimated during calibration, e.g. using one or more sensors, e.g. of the auxiliary device and/or the hearing aid, e.g. a camera, and/or a radar sensor. The hearing aid system (HAS) may be configured to make data representative of the estimated location of the loudspeaker (AD-SPK) relative to the hearing aid (HD) microphones ($M_1$, $M_2$) available (e.g. transmitted) to the hearing aid (e.g. via the communication link (WL-RF), and e.g. to form part of the mode control signal (MCtr) fed to the controller (TF-PRO).

The auxiliary device (AD) comprises a controller (CNT) configured to—in said specific (far-field) calibration mode of operation—provide a test or calibration signal (CalS), which is fed to and played by the loudspeaker (AD-SPK) thereby providing the test sound signal (cf. also FIG. 2). The controller (CNT) may comprise a test signal generator for providing the test signal (CalS). The test signal may be (electromagnetically) transmitted directly to the hearing aid via communication link (WL-RF), cf. signal CalS' fed to the transceiver (TX/RX) of the auxiliary device. In the hearing aid, the wirelessly received test signal (based on CalS') may be represented by signal ADin, and—in the calibration mode of operation—stored in the memory (MEM) together with corresponding time segments of the electric input signals ($S_1(\omega)$, $S_2(\omega)$) representing the (electric) versions of the test sound signals received at the hearing aid microphones ($M_1$, $M_2$). Thereby the controller (TF-PRO) of the hearing aid may determine (frequency dependent) HRTFs for sound propagating from the current location of the loudspeaker (AD-SPK) relative to microphones ($M_1$, $M_2$) of the hearing aid (as described above).

The auxiliary device (AD) is configured to allow the control inputs (UCtr) from the user control interface (UI) to control the transmission of microphone signals (ADM-IN) and/or test/calibration signals (CalS') and/or other control signals (UCtr), e.g. mode control signals for initiating and/or terminating a calibration mode, and/or other modes of operation of the hearing aid (e.g. a telephone mode) from the auxiliary device to the hearing aid(s).

In the embodiments of FIG. 1-3 communication between the hearing aid (HD) and the auxiliary device (AD) may be in the base band (audio frequency range, e.g. between 0 and 20 kHz). Preferably however, communication between the hearing device and the auxiliary device is based on some sort of modulation at frequencies above 100 kHz. Preferably, frequencies used to establish a communication link between the hearing device and the auxiliary device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology) or a related technology.

FIGS. 4A, 4B and 4C together illustrate an exemplary application scenario of an embodiment of a hearing system according to the present disclosure.

FIG. 4A illustrates a user, a binaural hearing aid system or hearing system and an auxiliary device during a calibration procedure (e.g. of a processing algorithm, e.g. a noise reduction system). FIG. 4A shows an embodiment of a head-worn binaural hearing aid system or a hearing system comprising left and right hearing devices ($HD_l$, $HD_r$) (e.g. hearing aids or ear pieces of a headset) in communication with a portable (handheld) auxiliary device (AD) functioning as a user interface (UI) for the binaural hearing aid system or hearing system. In an embodiment, the binaural hearing aid system or hearing system comprises the auxiliary device AD (and the user interface UI). Exemplary screens of the user interface UI of the auxiliary device AD are shown in FIGS. 4B and 4C. The user interface comprises a display (e.g. a touch sensitive display) displaying guidance to the user to select and initiate (or terminate) a calibration mode of operation of the hearing aid system or hearing system. The user interface is implemented as an application program (APP) on the auxiliary device (e.g. a smartphone). The APP is denoted 'Calibration APP. Activate calibration mode'. Via the display of the user interface UI, the user U is instructed to select either Far-field calibration (HRTF), or Own voice calibration (OVTF). The calibration type is selected by pressing the 'button' in question, which when selected is indicated in grey shading, and instructions to the user for carrying out the procedure for the particular calibration are shown in the lower part of the screen. The individual screens for the two calibration types are shown in FIGS. 4B and 4C, respectively.

FIG. 4B illustrates the auxiliary device AD running an APP for initiating the calibration procedure for personalizing own voice transfer functions.

The instructions for calibrating own voice transfer functions (OVTF) are
Locate device horizontally (microphone close to mouth).
During calibration keep your head still and don't move device.
Speak normally for ~10 s.
These instructions should prompt the user to
Place the device with its microphone input close to the user's mouth (e.g. ≤0.1 m from) while trying to minimize reflections of the user's voice by the device (which may provide reverberation-like disturbances and thus degrade the quality of the OVTF-estimation).
Preferably, keep the device (and the body) as still as possible during the length of the calibration, which is estimated at 10 seconds.
Speak normal sentences during the calibration period (e.g. with a normal vocal effort). A further instruction may be to ask the user to read a specific text that is known to 'excite' a relevant frequency range of the user's voice.
Press Start/Stop 'button' to initiate calibration procedure.
FIG. 4C illustrates the auxiliary device running an APP for initiating the calibration procedure for personalizing head related transfer functions.

The instructions for calibrating head related transfer functions (HRTF) are
Locate (e.g. hold) device at intended location with screen towards you (loudspeaker at ear-level).
Activate selfie mode.
During calibration (while test sound is being played) keep your head still and don't move device.
These instructions should prompt the user to
Place the auxiliary device in a location (direction and distance) relative to the user where the target sound source is expected to be located, e.g. in front of the user, e.g. ≥1 m away from the user, e.g. by holding the auxiliary device in a hand or on mounted on a stick (e.g. a 'selfie-stick').
Activate a camera mode of operation where the screen shows you a 'mirror-image of yourself'. This might help in positioning the device in the right height (and may facilitate the use of automatic positioning sensing using the camera image). Preferably, the device should be at level with the eyes (and ears) of the user.
Preferably, to keep the device (and the body) as still as possible during the length of the calibration, which can be verified by the user by the perception of the test sound (the calibration procedure is e.g. estimated at 10 seconds). The camera of the auxiliary device may record the user while the sound is played (allowing an estimate of possible movements during calibration).
Press Start/Stop 'button' to initiate calibration procedure.
The Start/Stop 'button' may further be used to terminate the calibration procedure, e.g. if something is not right (sudden movements, noise, other activities, etc.).

An acceptance step, requesting the user to accept the calibration measurement may be included (to give the user a chance to discard the results, if for some reason they are not as intended, e.g. due to noise or other unintended events during the measurements).

Preferably, the initiation time of the calibration procedure (pressing of START) (and possibly the start time (and/or end time) of the calibration signal), the chosen location (e.g. angle and distance to the user), and possibly characteristics of the calibration signal (magnitude vs. frequency, spectrum, or the calibration signal itself (or a part thereof), etc.), are communicated to the left and right hearing devices for use in determining customized head related transfer functions (HRTF) or own voice transfer functions (OVTF). The customized (personalized) transfer functions may e.g. be used to choose an appropriate corresponding (e.g. predetermined) set of filter weights, or for calculating such weights, e.g. for an appropriate beamformer (cf. e.g. FF-BF and OV-BF in FIG. 3).

Figure 5:
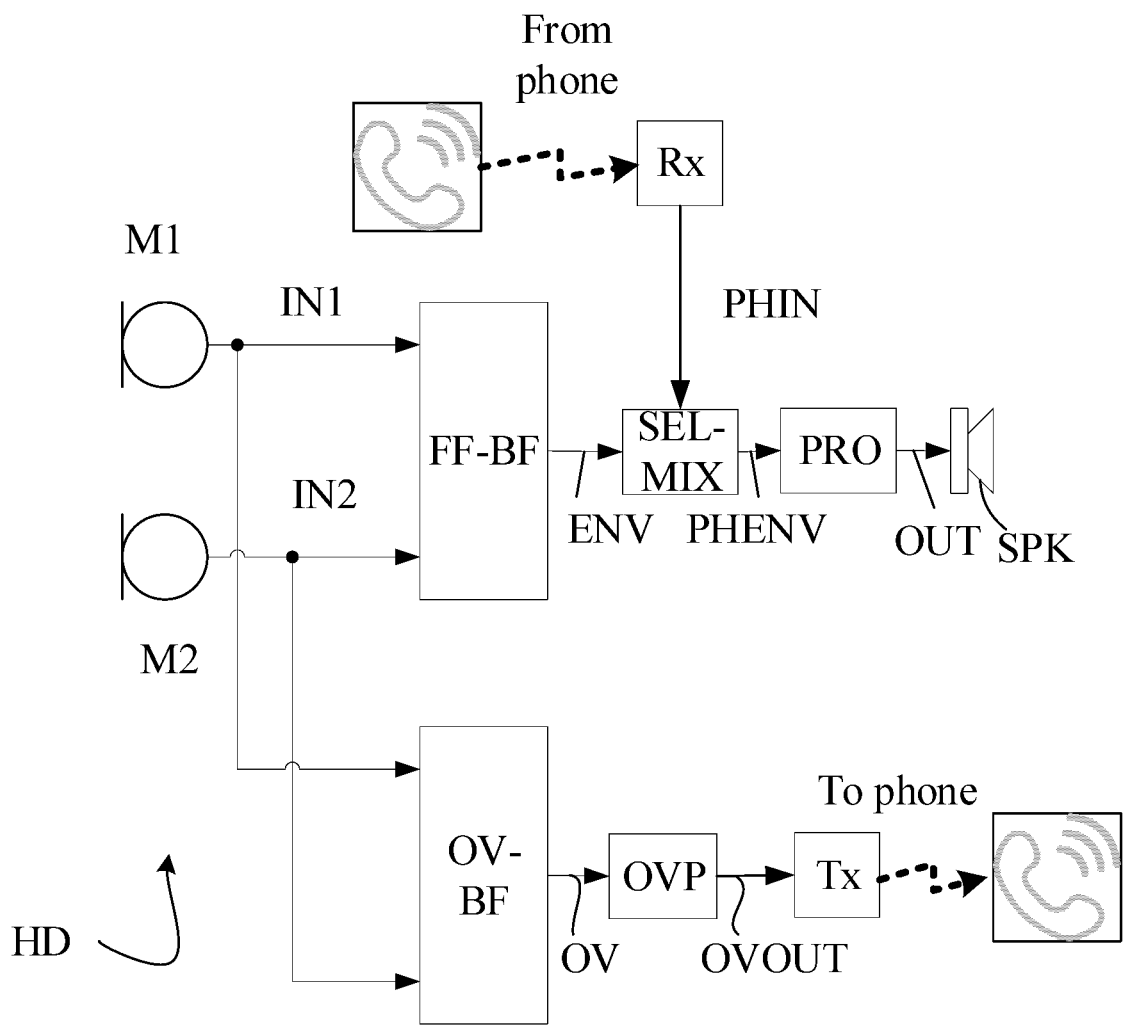
FIG. 5 shows an embodiment of a headset or a hearing aid comprising own voice estimation and the option of transmitting the own voice estimate to another device, and to receive sound from another device for presentation to the user via a loudspeaker, e.g. mixed with sound from the environment of the user.

An example of an application of personalized transfer functions according to the present disclosure is illustrated in FIG. 5. FIG. 5 shows an embodiment of a headset or a hearing aid comprising own voice estimation and the option of transmitting the own voice estimate to another device, and to receive sound from another device for presentation to the user via a loudspeaker, e.g. mixed with sound from the environment of the user. The hearing aid or headset (HD) (here termed 'hearing device') comprises two microphones (M1, M2) configured to provide electric input signals (IN1, IN2) representing sound in the environment of a user wearing the hearing device. The hearing device further comprises two beamformers (FF-BF) and (OV-BF), each providing a spatially filtered signal (ENV and OV respectively) based on the electric input signals (IN1, IN2) and personalized beamformer weights according to the present disclosure. The (Far-field) beamformer (FF-BF) may e.g. implement a target maintaining, noise cancelling, beamformer comprising beamformer weights determined in dependence of personalized acoustic transfer functions (HRTF) estimated according to the present disclosure. The own voice beamformer (OV-BF) is configured to pick up the user's voice (originating from the user's mouth and throat) and comprises beamformer weights determined in dependence of personalized acoustic transfer functions (OV-TF) estimated according to the present disclosure. The hearing device may e.g. comprise an own voice detector configured to detect whether or not (or with what probability) the user's own voice is present (e.g. in the at least one electric input signal) at a given point in time, and to provide an own voice presence control signal indicative thereof. The own voice beamformer (OV-BF) may e.g. be activated in dependence of an own voice presence control signal, and/or a telephone mode control signal, and/or a far-end talker presence control signal, and/or a user-initiated control signal (e.g. via a user interface (UI)). In a specific telephone mode of operation (e.g. a normal mode of operation of a headset), the user's own voice is picked up by the microphones M1, M2 and spatially filtered by the own voice beamformer (OV-BF) providing signal OV, which—optionally via own voice processor (OVP) providing enhanced own voice signal (OVOUT)—is fed to transmitter Tx and transmitted (by cable or wireless link to a another device or system (e.g. a telephone, cf. dashed arrow denoted 'To phone' and telephone symbol)). In the specific telephone mode of operation (e.g. a normal mode of operation of a headset), signal PHIN may be received by (wired or wireless) receiver Rx from another device or system (e.g. a telephone, as indicated by telephone symbol and dashed arrow denoted 'From Phone'). When a far-end talker is active, signal PHIN contains speech from the far-end talker, e.g. transmitted via a telephone line (e.g. fully or partially wirelessly, but typically at least partially cable-borne). The 'ar-end' telephone signal PHIN may be selected or mixed with the environment signal ENV from the far-field beamformer (FF-BF) in a combination unit (here selector/mixer SEL-MIX), and the selected or mixed signal PHENV is fed to output transducer SPK (e.g. a loudspeaker or a vibrator of a bone conduction hearing device) for presentation to the user as sound. Optionally, as shown in FIG. 5, the selected or mixed signal PHENV may be fed to processor PRO for applying one or more processing algorithms to the selected or mixed signal PHENV to provide processed signal OUT, which is then fed to the output transducer SPK. The embodiment of a hearing device (HD) of FIG. 5 may represent a headset, in which case the received signal PHIN may be selected for presentation to the user without mixing with an environment signal. The embodiment of FIG. 5 may represent a hearing aid, in which case the received signal PHIN may be mixed with an environment signal before presentation to the user (to allow a user to maintain a sensation of the surrounding environment; the same may of course be relevant for a headset application, depending on the use-case). Further, in a hearing aid, the processor (PRO) may be configured to compensate (signal PHENV) for a hearing impairment of the user of the hearing device (hearing aid).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[Farina, 2000]: Farina, Angelo. "Simultaneous measurement of impulse response and distortion with a swept-sine technique." Audio Engineering Society Convention 108. Audio Engineering Society, 2000

[Jensen et al., 2015]: J. Jensen and M. S. Pedersen, "Analysis of Beamformer Directed Single-Channel Noise Reduction System for Hearing Aid Applications", Proc. Int. Conf. Acoust., Speech, Signal Processing, pp. 5728-5732, April 2015.

[Brandstein et al., 2001]: M. Brandstein and D. Ward (Eds.), "Microphone Arrays—Signal Processing Techniques and Applications," Springer, 2001.

[Haykin, 2001]: S. Haykin, "Adaptive Filter Theory", Prentice Hall, 2001.

[Heymann, et al., 2017] J. Heymann, L. Drude, R. Haeb-Umbach, "A Generic Neural Acoustic Beamforming Architecture for Robust Multi-Channel Speech Processing," Computer, Speech and Language, Vol. 46, pp. 374-385, November 2017.

[Garde, 2019]. J. Garde, "Own-Voice Retrieval for Hearing Assistive Devices: A Combined DNN-Beamforming Approach," Master's Thesis, Aalborg University, 2019. EP2928215A1 (Oticon) Jul. 10, 2015

The invention claimed is:

1. A hearing system comprising
a headset adapted for being worn by a user at or in an ear of the user, and
a portable auxiliary device,
wherein the headset is adapted to establish a communication link to the auxiliary device to provide that data can be exchanged between the headset and the auxiliary device, or forwarded from one of the headset and the auxiliary device to the other,
wherein the headset further comprises
an input unit comprising at least one microphone for picking up sound from the environment of the headset, including the user's own voice, and to provide at least one electric input signal representative of said sound,
an output unit for presenting stimuli perceivable as sound to the user, and
a signal processor configured to
perform a processing on
a time segment of said at least one electric input signal, and a corresponding time segment of at least one auxiliary electric input signal provided by a microphone of said auxiliary device, or
a transform of said time segment of said at least one electric input signal, and a corresponding transform of said corresponding time segment of said at least one auxiliary electric input signal, or
a selected frequency range of said time segment of said at least one electric input signal, and a selected frequency range of said corresponding time segment of said at least one auxiliary electric input signal; and
provide, based on said processing, an estimate of an acoustic transfer function from a microphone of said auxiliary device to said at least one microphone of the headset.

2. A hearing system according to claim 1 wherein the headset is configured to pick up the user's own voice via said input unit and to transmit the picked-up user's own voice to a far-end communication partner, and to receive sound from a far-end communication partner and present the received sound to the user via the output unit of the headset.

3. A hearing system according to claim 1 wherein the input unit of the headset comprises at least two microphones each providing an electric input signal.

4. A hearing system according to claim 3 comprising a beamformer filter providing one or more beamformers by applying predetermined or adaptively determined filter weights to the respective electric input signals of the at least two microphones.

5. A hearing system according to claim 4 wherein the one or more beamformers comprise an own voice beamformer comprising personalized filter weights, the own voice beamformer being configured to enhance signals originating from the direction of the user's mouth and to suppress sound signals from other directions.

6. A hearing system according to claim 5 wherein said personalized filter weights are determined in dependence of the estimate of at least one acoustic transfer function from said at least one microphone of said auxiliary device to said at least two microphones of the headset.

7. A hearing system according to claim 4 wherein said one or more beamformers further comprises a beamformer comprising personalized filter weights, wherein the beamformer is configured to suppress sound signals from a far-field speaker.

8. A hearing system according to claim 1 wherein said headset, in a communication mode of operation, is configured to transmit a signal comprising the estimate of the user's own voice to another device.

9. A hearing system according to claim 1 wherein said auxiliary device comprises at least one microphone for picking up sound from the environment of the auxiliary device and for providing corresponding at least one auxiliary electric input signal representative of the sound.

10. A hearing system according to claim 1 wherein said auxiliary device comprises a user control interface allowing a user to initiate a specific calibration mode of operation of the hearing system.

11. A hearing system according to claim 10 wherein the auxiliary device is configured to generate a calibration control signal upon initiation of the specific calibration from the user control interface.

12. A hearing system according to claim 11 wherein the auxiliary device is configured to transmit a current time segment of the at least one auxiliary electric input signal, or a transform of the current time segment of the at least one auxiliary electric input signal, or a selected frequency region of the current time segment of the at least one auxiliary electric input signal, to the headset in dependence of the calibration control signal.

13. A hearing system according to claim 1 wherein said headset and said auxiliary device comprises antenna and transceiver circuitry allowing the communication link to be established between the head set and the auxiliary device.

14. A hearing system according to claim 1 wherein said headset comprises a single earpiece adapted to be located at a left and/or right ear of the user.

15. A hearing system according to claim 1 wherein said headset comprises left and right earpieces adapted to be located at left and right ears of the user, respectively.

16. A hearing system according to claim 15 wherein said left and right earpieces are configured to establish a communication link allowing the exchange of data between them.

17. A hearing system according to claim 1 comprising a memory that stores:
- said time segment of said at least one electric input signal, and/or said corresponding time segment of said at least one auxiliary electric input signal, or
- said transform of said at least one electric input signal, and/or said corresponding transform of said at least one auxiliary electric input signal, or
- said selected frequency of said at least one electric input signal, and/or said selected frequency region of said at least one auxiliary electric input signal.

18. A hearing system according to claim 1 comprising a distance sensor for estimating a distance between the auxiliary device and the headset.

19. A non-transitory computer-readable medium on which is stored an application, termed an APP, comprising executable instructions configured to be executed on an auxiliary device to implement a user control interface for a hearing system as claimed in claim 1 wherein the user control interface is configured to allow a user to control functionality of the hearing system, including an initiation of a specific calibration mode of operation of the hearing system.

20. A non-transitory computer-readable medium according to claim 19 wherein the APP is configured to run on a cellular phone or on another portable device allowing communication with said headset or said hearing system.

21. A method of operating a hearing system, the hearing system comprising
- a headset adapted for being worn by a user at or in an ear of the user, the headset comprising at least one microphone, and
- a portable auxiliary device comprising at least one auxiliary microphone,
- wherein the hearing system is adapted to establish a communication link between the headset and the auxiliary device by which data is exchanged between the headset and the auxiliary device, or forwarded from one to of the headset and the auxiliary device to the other, the method comprising
in the headset
- receiving, via the at least one microphone, at least one electric input signal representative of sound from the environment of the headset,
- presenting stimuli perceivable as sound to the user, in the auxiliary device
- receiving, via the at least one auxiliary microphone, at least one auxiliary electric input signal representative of said sound from the environment of the headset, performing a processing on
- a time segment of said at least one electric input signal, and a corresponding time segment of said at least one auxiliary electric input signal, or
- a transform of said time segment of said at least one electric input signal, and a corresponding transform of said corresponding time segment of said at least one auxiliary electric input signal, or
- a selected frequency region of said time segment of said at least one electric input signal, and a selected frequency region of said corresponding time segment of said at least one auxiliary electric input signal, and providing, based on said processing, an estimate of a personalized transfer function from said at least one auxiliary microphone of said auxiliary device to said at least one microphone of said headset.

22. A method according to claim 21 further comprising providing a user control interface allowing the user to initiate a specific own voice calibration mode of operation of the hearing system.

23. A method according to claim 21 further comprising providing an own voice beamformer comprising personalized filter weights determined in dependence of said estimate of a personalized transfer function.

24. A headset configured to be used in a hearing system, wherein the headset is configured to be worn by a user at or in an ear of the user, the headset comprising
- antenna and transceiver circuitry allowing the headset to establish a communication link to an auxiliary device to provide that data can be exchanged between them or forwarded from one to the other,
- at least one microphone for picking up sound from the environment of the headset and for provide corresponding at least one electric input signal representative of said sound,
- a signal processor configured to process said at least one electric input signal or a signal or signals derived therefrom, and
- an output transducer for presenting stimuli perceivable as sound to the user representative of the processed signal,
- wherein the headset is configured to receive at least one auxiliary electric input signal provided by a microphone of said auxiliary device via said communication link, and
- wherein the signal processor, in a specific own voice calibration mode of operation of the headset, is configured
  to perform a processing on
  - a time segment of said at least one electric input signal, and a corresponding time segment of said at least one auxiliary electric input signal, or
  - a transform of said time segment of said at least one electric input signal, and a corresponding transform of said corresponding time segment of said at least one auxiliary electric input signal, or
  - a selected frequency range of said time segment of said at least one electric input signal, and a selected frequency region of said corresponding time segment of said at least one auxiliary electric input signal, and
  to provide, based on said processing, an estimate of a personalized own voice transfer function from said microphone of said auxiliary device to said at least one microphone of the headset.

25. A headset according to claim 24 further comprising a beamformer filter configured to provide an own voice beamformer or an own-voice cancelling beamformer comprising personalized filter weights determined in dependence of said estimate of a personalized own voice transfer function.

26. A headset according to claim 25 configured to receive a calibration control signal from a user control interface allowing a user to initiate said specific own voice calibration mode of operation of the headset.

* * * * *